(12) United States Patent
Maaref et al.

(10) Patent No.: US 12,069,675 B2
(45) Date of Patent: Aug. 20, 2024

(54) METHOD FOR COMMUNICATION AND AN APPARATUS THEREOF

(71) Applicant: Huawei Technologies Co., Ltd., Shenzhen (CN)

(72) Inventors: Amine Maaref, Ottawa (CA); Mohammadhadi Baligh, Ottawa (CA); Jianglei Ma, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 409 days.

(21) Appl. No.: 17/326,696

(22) Filed: May 21, 2021

(65) Prior Publication Data

US 2021/0352707 A1 Nov. 11, 2021

Related U.S. Application Data

(63) Continuation of application No. 16/808,216, filed on Mar. 3, 2020, now Pat. No. 11,051,330, which is a continuation of application No. 16/265,790, filed on Feb. 1, 2019, now Pat. No. 10,681,722.

(60) Provisional application No. 62/659,049, filed on Apr. 17, 2018.

(51) Int. Cl.
*H04W 72/23* (2023.01)
*H04L 5/00* (2006.01)
*H04W 76/27* (2018.01)

(52) U.S. Cl.
CPC ........... *H04W 72/23* (2023.01); *H04L 5/0048* (2013.01); *H04W 76/27* (2018.02)

(58) Field of Classification Search
CPC ... H04L 1/0061; H04L 5/0051; H04L 5/0023; H04W 48/12
See application file for complete search history.

(56) References Cited

U.S. PATENT DOCUMENTS

| 10,681,722 | B2 | 6/2020 | Maaref et al. |
|---|---|---|---|
| 2013/0039284 | A1 | 2/2013 | Marinier et al. |
| 2014/0161157 | A1 | 6/2014 | Balraj et al. |
| 2014/0341180 | A1 | 11/2014 | Liu et al. |
| 2015/0036625 | A1 | 2/2015 | Nam et al. |
| 2015/0189629 | A1 | 7/2015 | Seo et al. |

(Continued)

FOREIGN PATENT DOCUMENTS

| CN | 102484550 A | 5/2012 |
|---|---|---|
| CN | 103248468 A | 8/2013 |

(Continued)

OTHER PUBLICATIONS

Intel Corporation, "DCI contents and formats", 3GPP TSG RAN WG1 #Ah 1801, R1-1800325, Jan. 22-26, 2018, 10 pages.

(Continued)

*Primary Examiner* — Yee F Lam
(74) *Attorney, Agent, or Firm* — Slater Matsil, LLP

(57) ABSTRACT

A base station may transmit downlink control information (DCI) scheduling communications between the base station and a UE. The DCI is in a fallback DCI format. Based on whether or not the DCI is in a UE specific search space with cyclic redundancy check (CRC) scrambled by a UE ID of the UE, data transmitted by the base station or by the UE according to the DCI may be scrambled by a sequence that is initialized with a configurable parameter, or initialized with a cell ID.

34 Claims, 8 Drawing Sheets

(56) References Cited

U.S. PATENT DOCUMENTS

| | | | |
|---|---|---|---|
| 2015/0245324 A1 | 8/2015 | Kim et al. | |
| 2015/0271866 A1 | 9/2015 | Yamada | |
| 2016/0278118 A1 | 11/2016 | Yerramalli et al. | |
| 2018/0368117 A1 | 12/2018 | Ying et al. | |
| 2019/0044669 A1 | 2/2019 | Davydov et al. | |
| 2019/0097861 A1 | 3/2019 | Kawasaki et al. | |
| 2019/0182807 A1* | 6/2019 | Panteleev | H04L 5/0048 |
| 2019/0222284 A1* | 7/2019 | Huang | H04W 72/23 |
| 2019/0222357 A1* | 7/2019 | Huang | H04L 5/0094 |
| 2019/0223084 A1* | 7/2019 | John Wilson | H04W 76/11 |
| 2019/0246395 A1* | 8/2019 | Huang | H04W 72/12 |
| 2019/0253308 A1* | 8/2019 | Huang | H04L 43/0823 |
| 2019/0261324 A1* | 8/2019 | Nam | H04L 5/0048 |
| 2019/0306700 A1* | 10/2019 | Lin | H04W 72/23 |
| 2019/0306841 A1* | 10/2019 | Huang | H04L 5/0055 |

FOREIGN PATENT DOCUMENTS

| | | |
|---|---|---|
| CN | 104704756 A | 6/2015 |
| CN | 104754537 A | 7/2015 |
| CN | 106559896 A | 4/2017 |
| CN | 106877991 A | 6/2017 |
| CN | 107294897 A | 10/2017 |
| CN | 107431933 A | 12/2017 |
| CN | 107453840 A | 12/2017 |
| JP | 2013507064 A | 2/2013 |
| JP | 2015534402 A | 11/2015 |
| WO | 2011041598 A2 | 4/2011 |
| WO | 2014058194 A1 | 4/2014 |
| WO | 2017057989 A1 | 4/2017 |

OTHER PUBLICATIONS

Oppo, "Text proposal for DMRS," 3GPP TSG RAN WG1 Meeting AH 1801, R1-1800484, Discussion and Decision, 7.2.3.3, Jan. 22-26, 2018, 19 pages, Vancouver, Canada.

NTT Docomo, Inc., "UL data transmission procedure," 3GPP TSG RAN WG1 Meeting #92, R1-1802488, Discussion and Decision, 7.1.3.3.4, Feb. 26-Mar. 2, 2018, 17 pages, Athens, Greece.

NTT Docomo, Inc., "Offline summary for AI 7.1.3.3.4 UL data transmission procedure," 3GPP TSG RAN WG1 Meeting #92, R1-1803295, Discussion and Decision, 7.1.3.3.4, Feb. 26-Mar. 2, 2018, 29 pages, Athens, Greece.

Intel Corporation, "Further considerations on DCI sizes," 3GPP Tsg-Ran WG1 Meeting #92bis, R1-1804727, Discussion and Decision, 7.1.3.1.4, Apr. 16-20, 2018, 5 pages, Sanya, Hainan.

"DCI design for URLLC", 3GPP TSG RAN WG1 Meeting #89, R1-1706916, Huawei, HiSilicon, 7.1.3.1.4, May 15-19, 2017, 4 pages, Hangzhou, China.

NTT Docomo, Inc., "Views on UE behavior for group-common PDCCH", 3GPP TSG RAN WG1 NR Ad-Hoc#2, R1-1711096, Discussion and Decision, 5.1.3.1.4.3, Jun. 27-30, 2017, 3 pages, Qingdao, P.R. China.

Ericsson, "CR to 38.211 capturing the RAN1#92bis and RAN1#93 meeting agreements," R1, 3GPP TSG-RAN1 Meeting #93, R1-1807955, May 21-25, 2018, 99 pages, Busan, Korea.

Samsung, "CR to TS 38.213 capturing the RAN1#92bis and RAN1#93 meeting agreements and aligning higher layer parameters with TS 38.331," R1, 3GPP TSG-RAN1 Meeting #93, R1-1807957, May 21-25, 2018, 106 pages, Busan, Korea.

* cited by examiner

METHOD FOR COMMUNICATION AND AN APPARATUS THEREOF

CROSS-REFERENCE TO RELATED APPLICATIONS

This application is continuation of U.S. application Ser. No. 16/808,216, filed on Mar. 3, 2020, which is continuation of U.S. application Ser. No. 16/265,790, filed on Feb. 1, 2019, now U.S. Pat. No. 10,681,722, which claims the benefit of U.S. provisional Application No. 62/659,049, filed on Apr. 17, 2018, entitled "A Method for Communication and an Apparatus thereof", all of which are hereby incorporated by reference in their entireties.

TECHNICAL FIELD

The present disclosure relates generally to wireless communications, and in particular embodiments, to systems and methods for data transmission and/or reference signals transmission.

BACKGROUND

In wireless communication field, in order to notify different parameters for transmission, different control information is sent from a transmit/receive point (TRP) to a user equipment (UE). Different control information may have different formats, which include one or more of different fields, different field orders, different bit lengths (also called payload sizes) for a same field, and other information. A format of control information, e.g., a downlink control information (DCI) format, may be involved for fallback. When a UE detects a format of control information for fallback, it needs to determine how to transmit or receive data and reference signals.

SUMMARY

Technical advantages are generally achieved, by embodiments of this disclosure which describe a method and apparatus for communication.

According one aspect of the present disclosure, a method is provided, that includes: receiving, by a user equipment (UE), downlink control information (DCI) that schedules data communication for the UE; and receiving, by the UE, data according to the DCI, the data being scrambled by a sequence, and the sequence being initialized with a configurable parameter when the DCI is in a first format and the DCI is in a UE specific search space with cyclic redundancy check (CRC) scrambled by a UE identifier (ID) of the UE. That is, the sequence is initialized with the configurable parameter in response to (or upon determining or when) that the DCI is in a first format and the DCI is in the UE specific search space with CRC scrambled by the ID of the UE.

Optionally, in any of the preceding aspects, the method further includes receiving, by the UE, the configurable parameter from a base station (BS).

Optionally, in any of the preceding aspects, the sequence is initialized with a cell ID when the DCI is in a common search space with CRC scrambled by the UE ID of the UE.

Optionally, in any of the preceding aspects, receiving the data according to the DCI includes descrambling, by the UE, the data using the sequence that is initialized with the configurable parameter.

Optionally, in any of the preceding aspects, the first format of the DCI is a format of DCI for fallback.

Optionally, in any of the preceding aspects, the UE ID comprises a cell-radio network temporary identifier (C-RNTI), a modulation and coding scheme-C-RNTI (MCS-C-RNTI) or a configured scheduling-RNTI (CS-RNTI).

Optionally, in any of the preceding aspects, the sequence is initialized using an initialized sequence that is determined based on the configurable parameter represented by $n_{ID}$.

Optionally, in any of the preceding aspects, $n_{ID} \in \{0,1,\ldots,1023\}$ is configured by higher-layer signaling. Optionally, $n_{ID} \in \{0,1,\ldots,1023\}$ may be indicated by a higher-layer parameter, or equal s a higher-layer parameter.

Optionally, in any of the preceding aspects, the initialized sequence is determined based on the configurable parameter represented by $n_{ID}$, wherein the initialized sequence satisfies $c_{init} = n_{RNTI} \cdot 2^{15} + q \cdot 2^{14} + n_{ID}$, $c_{init}$ is the initialized sequence, and $n_{RNTI}$ corresponds to a RNTI associated with a physical downlink shared channel (PDSCH) transmission.

Optionally, in any of the preceding aspects, receiving the DCI comprises detecting the DCI after a radio resource control (RRC) configuration procedure is performed.

Optionally, in any of the preceding aspects, the first format comprises a DCI format 1_0 for a PDSCH.

According another aspect of the present disclosure, an apparatus is provided, that includes one or more processors, configured to couple with a non-transitory memory storage, wherein the non-transitory memory storage is configured to store instructions, which when executed, cause the one or more processors to: receive downlink control information (DCI) that schedules data communication for the apparatus or a UE which the apparatus is used for; and receive data according to the DCI, the data being scrambled by a sequence, and the sequence being initialized with a configurable parameter when the DCI is in a first format and the DCI is in a UE specific search space with cyclic redundancy check (CRC) scrambled by a UE identifier (ID) of the apparatus or a UE which the apparatus is used for. That is, the sequence is initialized with the configurable parameter in response to (or upon determining that or when) the DCI is in a first format and the DCI is in the UE specific search space with CRC scrambled by the ID of the UE.

Optionally, in any of the preceding aspects, the one or more processors execute the instructions to further receive the configurable parameter from a base station (BS).

Optionally, in any of the preceding aspects, the sequence is initialized with a cell ID when the DCI is in a common search space with CRC scrambled by the UE ID of the apparatus that schedules data communication for the apparatus.

Optionally, in any of the preceding aspects, receiving the data according to the DCI comprises descrambling the data using the sequence that is initialized with the configurable parameter.

Optionally, in any of the preceding aspects, the first format of the DCI is a format of DCI for fallback.

Optionally, in any of the preceding aspects, the UE ID comprises a cell-radio network temporary identifier (C-RNTI) or a configured scheduling-RNTI (CS-RNTI).

Optionally, in any of the preceding aspects, the sequence is initialized using an initialized sequence that is determined based on the configurable parameter represented by $n_{ID}$.

Optionally, in any of the preceding aspects, $n_{ID} \in \{0,1,\ldots,1023\}$ may be configured by higher-layer signaling. Optionally, $n_{ID} \in \{0,1,\ldots,1023\}$ may be indicated by a higher-layer parameter, or equal a higher-layer parameter.

Optionally, in any of the preceding aspects, the initialized sequence is determined based on the configurable parameter represented by $n_{ID}$, wherein the initialized sequence satisfies $c_{init}=n_{RNTI}\cdot 2^{15}+q\cdot 2^{14}+n_{ID}$, $c_{init}$ represents the initialized sequence, and $n_{RNTI}$ corresponds to a RNTI associated with a physical downlink shared channel (PDSCH) transmission.

Optionally, in any of the preceding aspects, receiving the DCI comprises detecting the DCI after a radio resource control (RRC) configuration procedure is performed.

Optionally, in any of the preceding aspects, the first format comprises a DCI format for a PDSCH.

According another aspect of the present disclosure, a non-transitory computer-readable media is provided that stores computer instructions, that when executed by one or more processors, cause the one or more processors to perform the steps of: receiving downlink control information (DCI) that schedules data communication for a UE which the media is used for; and receiving data according to the DCI, the data being scrambled by a sequence, and the sequence being initialized with a configurable parameter when the DCI is in a first format and the DCI is in a UE specific search space with cyclic redundancy check (CRC) scrambled by a UE identifier (ID) of the UE.

Optionally, in any of the preceding aspects, the computer instructions cause the one or more processors to further perform receiving the configurable parameter from a base station (BS).

Optionally, in any of the preceding aspects, the sequence is initialized with a cell ID when the DCI is in a common search space with CRC scrambled by the UE ID of the UE.

Optionally, in any of the preceding aspects, receiving the data according to the DCI comprises descrambling the data using the sequence that is initialized with the configurable parameter.

Optionally, in any of the preceding aspects, the first format of the DCI is a format of DCI for fallback.

Optionally, in any of the preceding aspects, the UE ID comprises a cell-radio network temporary identifier (C-RNTI), a modulation and coding scheme-C-RNTI (MCS-C-RNTI) or a configured scheduling-RNTI (CS-RNTI).

Optionally, in any of the preceding aspects, the sequence is initialized using an initialized sequence that is determined based on the configurable parameter represented by $n_{ID}$, and wherein $n_{ID} \in \{0,1,\ldots,1023\}$ is configured by higher-layer signaling.

Optionally, in any of the preceding aspects, the initialized sequence is determined based on the configurable parameter represented by $n_{ID}$, wherein the initialized sequence satisfies $c_{init}=n_{RNTI}\cdot 2^{15}+q\cdot 2^{14}+n_{ID}$, $c_{init}$ is the initialized sequence, and $n_{RNTI}$ corresponds to a RNTI associated with a physical downlink shared channel (PDSCH) transmission.

The foregoing aspects allow use of a configurable ID for scrambling of a PDSCH or a PUSCH when a UE is scheduled with fallback DCI in UE-specific search space, which provides more flexibility in scrambling the PUSCH or PDSCH by using the configurable ID, and also allow use of a cell ID for scrambling a PDSCH or a PUSCH when fallback DCI is scheduled in common search space, which enables the handling of periods of ambiguity or uncertainty of a configuration of the UE during RRC reconfiguration or configuration.

BRIEF DESCRIPTION OF THE DRAWINGS

For understanding of the present embodiments, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
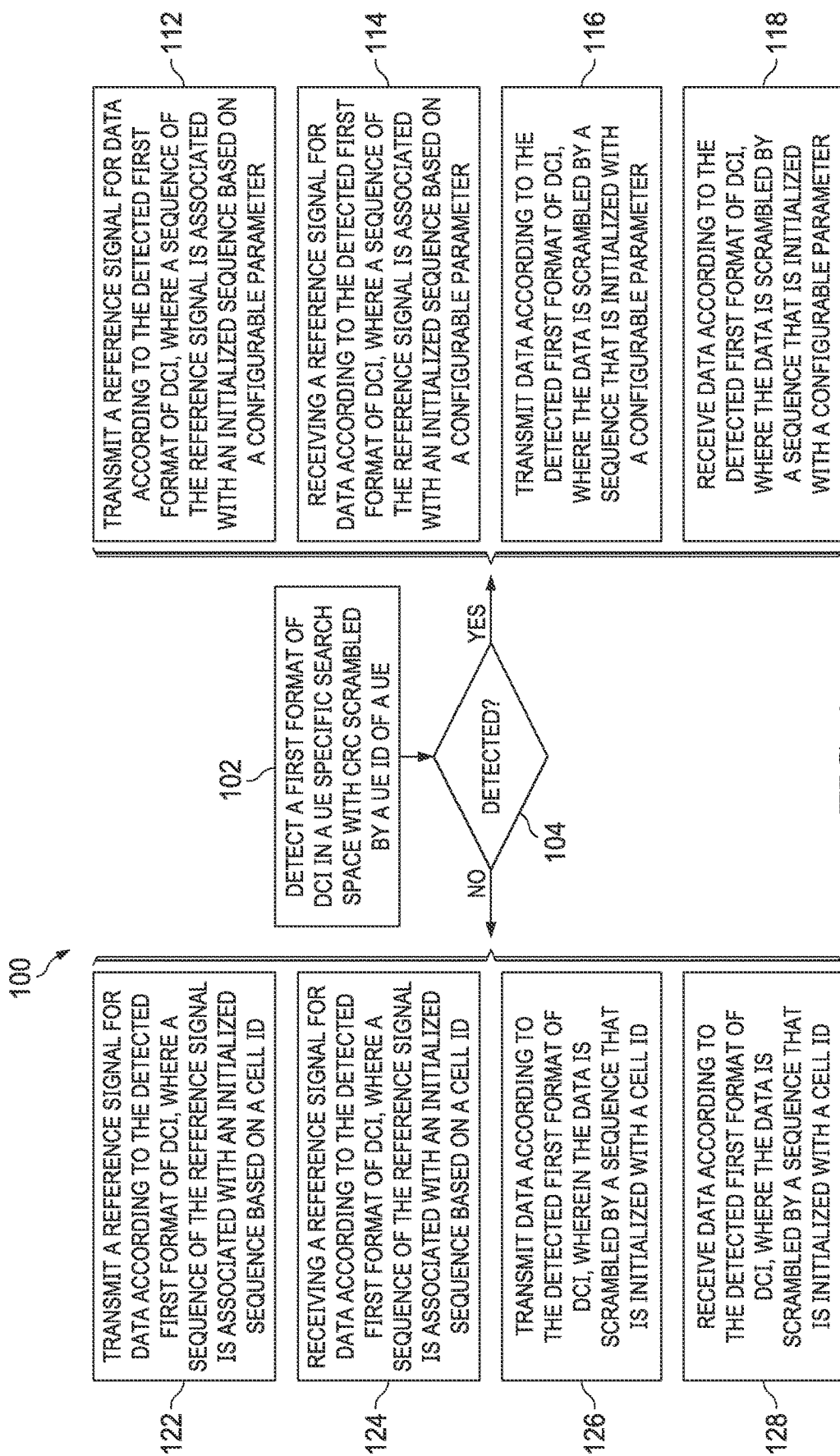
FIG. 1 illustrates a flowchart of an embodiment method for wireless communications.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Downlink control information (DCI) may be sent by a base station (BS) to schedule communications between the BS and a user equipment (UE). The DCI may be transmitted in a fallback DCI format. A fallback DCI format may be a DCI format 0_0 for uplink transmissions or a DCI format 1_0 for downlink transmissions. Embodiments of the present disclosure provide methods and apparatus for communicating data according to DCI transmitted in a fallback DCI format. In some embodiments, based on whether or not the DCI is in a UE specific search space with cyclic redundancy check (CRC) scrambled by a UE ID of the UE, data transmitted by the BS or by the UE according to the DCI may be scrambled by a sequence that is initialized with a configurable parameter, or initialized with a cell ID.

In some embodiments, a UE may receive DCI that schedules data communication for the UE, and transmit data according to the DCI, where the data is scrambled by a sequence that is initialized with a configurable parameter in response to the DCI being in a first format (e.g., a fallback DCI format) and the DCI being in a UE specific search space with CRC scrambled by a UE ID of the UE.

In some embodiments, a UE may receive DCI that schedules data communication for the UE, and receive data according to the DCI, where the data is scrambled by a sequence that is initialized with a configurable parameter when the DCI is in a first format (e.g., a fallback DCI format) and the DCI is in a UE specific search space with CRC scrambled by a UE ID of the UE. The UE may then descramble the data using a sequence that is initialized with the configurable parameter.

In some embodiments, a BS may transmit DCI scheduling data communication between the BS and a UE, where the DCI is in a first format (e.g., a fallback DCI format), and the DCI is in a UE specific search space with CRC scrambled by a UE ID of the UE. The BS may transmit data according to the DCI, where the data is scrambled by a first sequence that is initialized with a configurable parameter.

In some embodiments, a BS may transmit DCI scheduling data communication between the BS and a UE, where the DCI is in a first format (e.g., a fallback DCI format), and the DCI is in a UE specific search space with CRC scrambled by a UE ID of the UE. The BS may receive data according to the DCI, where the data is scrambled by a first sequence that is initialized with a configurable parameter.

A UE may monitor a set of control channel candidates, e.g., physical downlink control channel (PDCCH) candidates, where the set of control channel candidates may use one or more search spaces, in one or more control resource sets (CORESETs) on an active downlink band width part (DL BWP) of each activated serving cell according to corresponding search spaces. Blind detection is the process whereby the UE attempts to determine whether there are any PDCCHs addressed to the UE, and is based on search spaces. There can be multiple search spaces in a single CORESET. The payload transmitted on a PDCCH is the downlink control information (DCI), to which a cyclic redundancy check (CRC) is attached to detect transmission errors and to signal the identity of the UE addressed. In NR, the CRC may consist of 24 bits, whereas in LTE, CRC for PDCCH may consist of 16 bits. Monitoring control channel candidates by the UE implies decoding each PDCCH candidate according to monitored downlink control information (DCI) formats. After PDCCH decoding, the UE checks the CRC to see if the UE in question is scheduled and if PDCCH has been received correctly. If no CRC error is detected when the UE uses a certain RNTI configured for the UE to de-mask the CRC on a PDCCH, the UE determines that PDCCH carries its own control information and follows up with the signaling instruction contained in the DCI (scheduling assignment, uplink grant etc.).

A DCI message may include downlink control information, where the DCI message may have CRC scrambled by one radio network temporary identifier (RNTI) corresponding to a UE. For example, downlink control information may include one or more downlink scheduling assignment such as any one of or a combination of information to receive, demodulate, or decode the physical downlink shared channel (PDSCH) on a bandwidth part or component carrier, uplink grant such as resources and/or transport format to use for uplink transmission, power control command, sidelink control information, or information on which symbols in a set of slots can be used for data transmission in uplink or reception in downlink, or preemption indication. One PDCCH may carry one or more DCI message. Different formats (referred to as DCI formats) have been defined for DCI messages in 3rd Generation Partnership Project (3GPP) Technical Specification (TS) 38.212 v.15.1.1, Section 7.3. Each format corresponds to a certain message size and usage. For example, DCI messages carrying different control information may have different sizes, and may use different DCI formats. A number of bits required for resource allocation may vary with cell bandwidth. As a result, a given DCI format may have different sizes depending on an overall configuration of a cell.

A common search space can be used to convey control information intended for a UE during random access procedures before the UE has been assigned a specific identity. In such cases, a DCI format with CRC scrambled by a pre-defined RNTI is used to address the UE. For example, SI-RNTI can be used to scramble the CRC for a DCI format in a common search space when scheduling system information, P-RNTI is used when transmitting a paging message, RA-RNTI and/or TC-RNTI are used for random-access, TPC-RNTI is used for uplink power control response, INT-RNTI is used for pre-emption indication and SFI-RNTI is used for slot-related information. The structure of any search space may be based on control channel elements (CCEs) and resource element groups (REG)s. The CCE is the unit upon which the search spaces for blind decoding are defined. In NR, each CCE consists of 6 REGs and each REG consists of one resource block in one OFDM symbol. A PDCCH is transmitted using a certain aggregation level of contiguous CCEs, i.e. 1, 2, 4, 8 or 16. CCE-to-REG mapping can be interleaved or non-interleaved and is in general a property of the CORESET. A common search space is similar in structure to a UE-specific search space, except for the fact that the set of CCEs forming the common search space are predefined and hence known to all UEs, i.e. the set of CCEs forming a common search space is independent of the UE ID used to scramble the CRC attached to a given DCI.

A set of PDCCH candidates that a UE may monitor may be defined in terms of PDCCH search spaces. A search space may be a common search space or a UE-specific search space. A DCI in a common search space may have cyclic redundancy check (CRC) scrambled by a cell ID (short of cell identifier or cell identity) that identifies a cell, or a UE ID (also referred to as a UE specific ID or a UE specific RNTI) that identifies a UE, or a community RNTI that may identify a group of UEs within a cell or multiple cells. A DCI in a UE-specific search space may have CRC scrambled by a UE ID. A common search space may be configured for a DCI format with CRC scrambled by a community RNTI that identifies a group of UEs within a cell or multiple cells, or a UE ID that identifies a UE. A UE-specific search space may be configured for a DCI format with CRC scrambled by a UE ID. A cell ID that identifies a cell represents a physical-layer cell identity which identifies a cell from a physical layer perspective. It may be acquired by a UE during a cell search procedure through detection of synchronization signals. There may be up to 1008 cell IDs in a new radio (NR) scenario. A community RNTI that identifies a group of UEs may be a system information-radio network temporary identifier (SI-RNTI), a radio access-RNTI (RA-RNTI), a P-RNTI (paging-RNTI), or other RNTI configured for a group of UEs.

For example, a UE may monitor PDCCH candidates in one or more of the following search spaces:
  a Type0-PDCCH common search space for a DCI format with CRC scrambled by a system information-radio network temporary identifier (SI-RNTI) on a primary cell;
  a Type0A-PDCCH common search space for a DCI format with CRC scrambled by a SI-RNTI on a primary cell;
  a Type1-PDCCH common search space for a DCI format with CRC scrambled by a radio access-RNTI (RA- RNTI), or a temporary cell-RNTI (TC-RNTI), or a cell-RNTI (C-RNTI) on a primary cell;

a Type2-PDCCH common search space for a DCI format with CRC scrambled by a P-RNTI (paging-RNTI) on a primary cell;

a Type3-PDCCH common search space for a DCI format with CRC scrambled by an interrupted transmission indication-RNTI(INT-RNTI), or a slot format indication-RNTI (SFI-RNTI), or a transmit power control-physical uplink shared channel-RNTI (TPC-PUSCH-RNTI), or a TPC-physical uplink control channel-RNTI (TPC-PUCCH-RNTI), or a TPC-sounding reference signal-RNTI (TPC-SRS-RNTI), or a C-RNTI, or a configured scheduling-RNTI (CS-RNTI) (e.g. one or more CS-RNTIs), or a semi-persistent channel state information-RNTI (SP-CSI-RNTI); and a UE-specific search space for a DCI format with CRC scrambled by a C-RNTI, or a MCS-C-RNTI (modulation coding scheme-C-RNTI), or a CS-RNTI(s), or a SP-CSI-RNTI.

Definition of different search spaces and the RNTIs used to scramble corresponding DCI formats as described above may be found in 3GPP TS 38.213, v15.1.0 or later versions.

Downlink control information for fallback may be referred to as fallback DCI. A format of fallback DCI (referred to as a fallback DCI format) may include DCI formats 0_0 and 1_0, as defined in 3GPP TS 38.212, v15.1.1, Section 7.3 or later versions. A fallback DCI format may be used for one or more of the following situations:

Initial access and broadcast signaling in a common search space. In this case, a cell ID may be used for data scrambling or sequence initialization of reference signals;

UE recovery;

Radio resource control (RRC) reconfiguration for a UE; and

Regular downlink and/or uplink UE specific communication in a common search space or a UE specific search space for cases of lower control channel overhead, e.g., lower physical downlink control channel (PDCCH) overhead (due to the shorter format of fallback DCI in fallback modes).

The set of information fields in a fallback DCI format is in general not configurable, resulting in a fixed size of the downlink and uplink DCI that is in a fallback DCI format in some embodiments. One of the use cases of the fallback downlink and uplink DCIs is to handle the periods of uncertainty during RRC configuration or reconfiguration of a UE as the exact time that a UE applies a certain configuration not known to the network. Another use case is to reduce signaling overhead, as in many situations, the fallback format provides flexibility to schedule smaller packets. The low-overhead of the fallback DCI is therefore beneficial in such cases.

CRC is a set of parity bits that is attached to a DCI message payload. An ID (e.g., a UE ID, or a cell ID, or a community RNTI) may be used in calculating CRC. That is, the CRC is scrambled with the ID. A UE ID may identify a UE. A UE ID may include a C-RNTI, a CS-RNTI, a modulation and coding scheme (MCS)-C-RNTI or a semi-persistent channel state information (SP-CSI)-RNTI. The cell ID may identify a cell. The community RNTI may include SI-RNTI, P-RNTI, RA-RNTI, TC-RNTI, INT-RNTI, SFI-RNTI, or TPC-RNTI (which may include TPC-PUSH-RNTI, TPC-PUCCH-RNTI, or, TPC-SRS-RNTI). After CRC attachment, bits of the DCI message (e.g., the DCI payload plus the CRC) may be encoded (e.g., using polar codes), and rate matched to form a PDCCH (in a search space). Upon receipt of DCI (or a DCI message), a UE may check the CRC using a RNTI or a set of RNTIs (e.g., one or more UE IDs and/or community RNTIs). The UE may compute a scrambled CRC based on a RNTI or a set of RNTIs on the received payload and compare it to the received CRC. If the CRC check is successful, the DCI message is determined to be correctly received and intended for the UE. Further, since the format of the DCI is a priori unknown to the UE, the UE needs to blindly detect the DCI format. A format of the DCI (also referred to as a DCI format) may be determined according to the RNTI used to scramble the CRC when the CRC check is successful.

In NR, different DCI formats may share the same DCI size, so the correspondence between a DCI format and a DCI size can be many-to-one. However, the DCI size for the fallback DCI is generally different from that of DCI used for scheduling downlink assignments, uplink grants, slot format indication or pre-emption indication. Since the fallback DCI supports a limited set of functionalities compared to the non-fallback DCI, the size of the fallback DCI format 1_0 may be smaller than that of the non-fall back DCI format 1_1. Similarly, the size of the fallback DCI format 0_0 may be smaller than that of the non-fall back DCI format 0_1. The size of the uplink fallback DCI format 0_0 and downlink fallback DCI format 1_0 may be aligned in order to reduce the number of blind decoding attempts at the UE. Similarly, the size of the uplink non-fallback DCI format 0_1 and downlink non-fallback DCI format 1-1 may be aligned in order to reduce the number of blind decoding attempts at the UE.

A fallback DCI may be sent in a common search space, and/or, in a UE specific search space. In embodiments of the present disclosure, a method for data and/or reference signals transmission is provided herein when fallback DCI is detected by a UE, that is, when fallback DCI is received by a UE. The embodiments allow use of a configurable ID for scrambling of PDSCH or PUSCH when a UE is scheduled with fallback DCI in UE-specific search space, which provides more flexibility in scrambling the PUSCH or PDSCH by using a configurable ID, and also allow use of a cell ID for scrambling PDSCH or PUSCH when fallback DCI is scheduled in common search space, which enables the handling of periods of ambiguity or uncertainty of the configuration of the UE during RRC reconfiguration or configuration.

FIG. 1 illustrates a flowchart of an embodiment method 100 for wireless communications. The method 100 may be indicative of operations by a UE communicating in a wireless network. As shown, at step 102, the UE detects a first format of downlink control information (DCI) in a UE specific search space with CRC scrambled by a UE ID of the UE. In one embodiment, the UE may monitor PDCCH search spaces (e.g., a common search space, a UE specific search space, or both), and receive the DCI in a monitored PDCCH search space. The UE may monitor a UE specific search space and detect that the DCI is in the first format, e.g., a format of fallback DCI. The UE may further detect whether the DCI in the first format is in the UE specific search space with CRC scrambled by the UE ID of the UE. The UE ID may include a C-RNTI, a CS-RNTI, a MCS-C-RNTI, or a SP-CSI-RNTI.

When the first format of the DCI is detected at step 104, the method 100 may include one or more of steps 112, 114, 116 and 118. At step 112, the UE transmits a reference signal for data according to the DCI in the detected first format (or, a reference signal for data scheduled by the DCI in the detected first format), where a sequence of the reference signal is associated with an initialized sequence based on a configurable parameter. The reference signal for the data may be a reference signal for a receiver to estimate a communication channel in order to receive (e.g., decode, or demodulate) the data transmitted by the UE. For example, the reference signal for the data may be a demodulation reference signal (DMRS) for a PUSCH. Optionally, the sequence of the reference signal associated with the initialized sequence may be generated based on the initialized sequence, and the initialized sequence may be generated based on the configurable parameter. The configurable parameter may be a higher layer parameter that is configurable. The configurable parameter may be received from a base station. The configurable parameter may correspond to a scrambling ID (SCID), represented by $n_{SCID}$. The configurable parameter may be identified by the SCID according to a correspondence between the configurable parameter and the SCID. $n_{SCID}$ may have a value of 0 or 1. The $n_{SCID}$ may be viewed as an ID identifying a configurable parameter, e.g., from two configurable parameters in the case of DMRS. The value of the configurable parameter can be signaled through a higher layer signaling, e.g., RRC. The $n_{SCID}$ may be signaled through a DMRS sequence initialization field in the DCI associated with the PDSCH or PUSCH transmission, if non-fallback DCI format 1_1 or 0_1 is used. If a fallback DCI format is used, then $n_{SCID}=0$.

At step 114, the UE receives a reference signal for data according to the DCI in the DCI in the detected first format (or, a reference signal for data scheduled by the DCI in the detected first format DCI in the detected first format), where a sequence of the reference signal is associated with an initialized sequence based on a configurable parameter. The reference signal for the data may be a reference signal for the UE to estimate a downlink channel in order to receive (e.g., decode, demodulate) the data transmitted to the UE. For example, the reference signal for the data may be a DMRS for a physical downlink shared channel (PDSCH) transmitted to the UE. The sequence of the reference signal associated with the initialized sequence may be generated based on the initialized sequence, and the initialized sequence may be generated based on the configurable parameter. The configurable parameter may be a higher layer parameter that is configurable. The configurable parameter may correspond to an SCID. The SCID may be represented as $n_{SCID}$. The configurable parameter may be identified by the SCID according to a correspondence between the configurable parameter and the SCID. The configurable parameter may be received from a base station. Optionally, the UE may descramble the received reference signal using the configurable parameter, e.g., using the initialized sequence generated based on the configurable parameter.

At step 116, the UE transmits data according to the DCI in the detected first format DCI in the detected first format (or, data scheduled by the DCI in the detected first format DCI in the detected first format), where the data is scrambled by a sequence that is initialized with a configurable parameter. For example, the UE may transmit a PUSCH scheduled by the DCI in the first format. The configurable parameter may be received from a base station. The configurable parameter may be a higher layer parameter that is configurable. An initialized sequence may be generated based on the configurable parameter, and the sequence may be generated based on the initialized sequence for scrambling the data to be transmitted.

At step 118, the UE receives data according to the DCI in the detected first format DCI in the detected first format (or, data scheduled by the DCI in the detected first format DCI in the detected first format), where the data is scrambled by a sequence that is initialized with a configurable parameter. For example, the UE may receive a PDSCH scheduled by the DCI in the first format. The UE may descramble the PDSCH based on the configurable parameter, e.g., using a sequence that is initialized with the configurable parameter. The configurable parameter may be received from a base station. The configurable parameter may be a higher layer parameter that is configurable.

The method 100 may include one or more of steps 122, 124, 126 and 128, when the first format of the DCI is not detected in the UE specific search space with the CRC scrambled by the UE ID of the UE at step 104. This may be the case where the DCI in the first format is not detected in the UE specific search space. For example, the DCI in the first format is detected in a common search space. In any of these cases, the UE may perform one or more of steps 122, 124, 126 and 128.

At step 122, the UE transmits a reference signal for data according to the DCI in the detected first format (or, a reference signal for data scheduled by the DCI in the detected first format), where a sequence of the reference signal is associated with an initialized sequence based on a cell ID. For example, the UE may transmit a DMRS for a PUSCH. The sequence of the reference signal may be generated based on the initialized sequence, and the initialized sequence may be generated based on the cell ID. The cell ID may identify a cell, for example, a cell serving the UE.

At step 124, the UE receives a reference signal for data according to the DCI in the detected first format (or, a reference signal for data scheduled by the DCI in the detected first format), where a sequence of the reference signal is associated with an initialized sequence based on a cell ID. For example, the UE may receive a DMRS for a PDSCH. The sequence of the reference signal may be generated based on the initialized sequence, and the initialized sequence may be generated based on the cell ID. The UE may descramble the received reference signal using the initialized sequence generated based on the cell ID.

At step 126, the UE transmits data according to the DCI in the detected first format (or, data scheduled by the DCI in the detected first format), where the data is scrambled by a sequence that is initialized with a cell ID. For example, the UE may transmit a PUSCH scheduled by the first format of DCI. An initialized sequence may be generated based on the cell ID, and the sequence is generated based on the initialized sequence.

At step 128, the UE receives data according to the DCI in the detected first format (or, data scheduled by the DCI in the detected first format), where the data is scrambled by a sequence that is initialized with a cell ID. For example, the UE may receive a PDSCH scheduled by the first format of DCI. The UE may descramble the received data using the sequence that is initialized with a cell ID.

As an optional description of the above steps, regarding the UE, the method comprises:
  detecting a first format of downlink control information (DCI) in UE specific search space with CRC scrambled by a UE ID;
  performing one or more of the following when the first format of DCI is detected:
    transmitting a reference signal for data according to the detected first format of DCI(or, a reference signal for data scheduled by the detected first format of DCI), wherein a sequence of the reference signal is associated with an initialized sequence based on a configurable parameter, received from a base station, corresponding to a scrambling ID;

receiving a reference signal for data according to the detected first format of DCI (or, a reference signal for data scheduled by the detected first format of DCI), wherein a sequence of the reference signal is associated with an initialized sequence based on a configurable parameter, received from a base station, corresponding to a scrambling ID (SCID for short, may be presented as nSCID);

transmitting data according to the detected first format of DCI (or, data scheduled by the detected first format of DCI), wherein the data is scrambled by a sequence which is initialized with a configurable parameter, received from a base station; and receiving data according to the detected first format of DCI (or, data scheduled by the detected first format of DCI), wherein the data is scrambled by a sequence which is initialized with a configurable parameter, received from a base station.

Furthermore, the method comprises performing one or more of the following when the first format of DCI is not detected in UE specific search space with CRC scrambled by the UE ID:

transmitting a reference signal for data according to the detected first format of DCI (or, a reference signal for data scheduled by the detected first format of DCI), wherein a sequence of the reference signal is associated with an initialized sequence based on a cell ID;

receiving a reference signal for data according to the detected first format of DCI (or, a reference signal for data scheduled by the detected first format of DCI), wherein a sequence of the reference signal is associated with an initialized sequence based on a cell ID;

transmitting data according to the detected first format of DCI (or, data scheduled by the detected first format of DCI), wherein the data is scrambled by a sequence which is initialized with a cell ID; and receiving data according to the detected first format of DCI (or, data scheduled by the detected first format of DCI), wherein the data is scrambled by a sequence which is initialized with a cell ID. Optionally, the detecting is performed after a radio resource control (RRC) configuration procedure.

Optionally, the scrambling ID ($n_{SCID}$), for example, the scrambling ID ($n_{SCID}$) in step 112 or step 114, may be a demodulation reference signal scrambling ID. A value of the $n_{SCID}$ may be 0.

Optionally, the reference signal, for example, the reference signal in step 112, step 114, step 122 or step 124, may be at least one of a demodulation reference signal (DMRS), a sounding reference signal (SRS), or, a channel state information reference signal (CSI-RS).

Optionally, the first format of DCI may be a format of DCI for fallback. For example, the first format may be a DCI format 1_0, or a DCI format 0_0.

The UE ID may be a C-RNTI or a CS-RNTI or a MCS-C-RNTI or a SP-CSI-RNTI.

Optionally, the initialized sequence, for example, the initialized sequence at step 112, that is associated with the sequence of the reference signal for data transmitted by the UE (i.e., uplink), e.g. DMRS for PUSCH, may be generated based on a configurable parameter corresponding to a scrambling ID. The initialized sequence, for example, the initialized sequence at step 112 may be a function of the configurable parameter. For example, the initialized sequence may be represented by $f(N_{ID}^{nSCID})$, where $N_{ID}^{nSCID} \in \{0, 1, \ldots, 65535\}$ as defined in 3GPP TS 38.211, v15.1.0 or later version. $N_{ID}^{nSCID}$ is the configurable parameter and may be given by a higher-layer parameter. The higher-layer parameter may be a UL-DMRS-Scrambling-ID (i.e., a scramblingID0) as defined in 3GPP TS 38.211, v15.1.0 or later version, where $n_{SCID}=0$. The UL-DMRS-Scrambling-ID is removed in later version and scramblingID0 instead is used. That is, the configurable parameter may be a UL-DMRS-Scrambling-ID (i.e., scramblingID0) that corresponds to an $n_{SCID}$ with a value of 0. The scramblingID0 may be signaled by a higher layer signaling, e.g., in a RRC information element (IE) "DMRS-UplinkConfig" for uplink transmission, e.g., for step 112. The scramblingID0 may also be signaled by a higher layer signaling, e.g., in a RRC information element (IE) "DMRS-DownlinkConfig" for downlink transmission, e.g., for step 114.

Optionally, the initialized sequence, for example, the initialized sequence at step 112 may be represented as a function of the configurable parameter using the following formula:

$$c_{init} = (2^{17}(N_{symb}^{slot} n_{s,f}^{\mu} + l + 1)(2N_{ID}^{nSCID} + 1) + 2N_{ID}^{nSCID} + n_{SCID}) \mod 2^{31}.$$

That is, the initialized sequence may satisfy the above formula. In this formula, $c_{init}$ is the initialized sequence, l is OFDM symbol number within the slot (that is, a number of orthogonal frequency division multiplexing (OFDM) symbols within a slot), $n_{s,f}^{\mu}$ is a number of slots within a frame (that is, the slot number within a frame), $N_{symb}^{slot}$ is a number of symbols per slot and $N_{ID}^{nSCID} \in \{0, 1, \ldots, 65535\}$ is the configurable parameter given by a higher-layer parameter UL-DMRS-Scrambling-ID (i.e., a scramblingID0), as defined in 3GPP TS 38.211, v15.1.0 or later version, where $n_{SCID}=0$.

Optionally, the initialized sequence, for example, the initialized sequence at step 114, that is associated with the sequence of the reference signal for data received by the UE (i.e., downlink), e.g. DMRS for PDSCH, may be generated based on a configurable parameter corresponding to a scrambling ID. Optionally, the reference signal for data may include a DMRS for a PDSCH that is scheduled according to the DCI in the detected first format. The initialized sequence may be a function of the configurable parameter, i.e. $f(N_{ID}^{nSCID})$, where $N_{ID}^{nSCID} \in \{0, 1, \ldots, 65535\}$, as defined in 3GPP TS 38.211, v15.1.0 or later version, which is the configurable parameter, and may be given by a higher-layer parameter. The higher-layer parameter may be a DL-DMRS-Scrambling-ID (i.e., a scramblingID0), as defined in 3GPP TS 38.211, v15.1.0 or later version, where $n_{SCID}=0$.

Optionally, the initialized sequence at step 114 may be represented as a function of the configurable parameter using the following formula:

$$c_{init} = (2^{17}(14 n_{s,f}^{\mu} + l + 1)(2N_{ID}^{nSCID} + 1) + 2N_{ID}^{nSCID}) \mod 2^{31}.$$

That is, the initialized sequence may satisfy the above formula. In this formula, $c_{init}$ is the initialized sequence, l is a number of OFDM symbols within a slot, $n_{s,f}^{\mu}$ is a number of slots within a frame, and $N_{ID}^{nSCID} \in \{0, 1, \ldots, 65535\}$. $N_{ID}^{nSCID}$ may be given by a higher-layer parameter DL-DMRS-Scrambling-ID (i.e., a scramblingID0), as defined in 3GPP TS 38.211, v15.1.0 or later version, where $n_{SCID}=0$. As discussed at step 116, when the first format of DCI is detected, data to be transmitted (e.g., a PUSCH transmitted from the UE to a base station) may be scrambled by a sequence that is initialized with a configurable parameter.

The sequence may be generated based on an initialized sequence that is determined based on the configurable parameter. Optionally, an initialized sequence may be a function of the configurable parameter, represented by $n_{ID}$, where $n_{ID} \in \{0,1, \ldots, 1023\}$. $n_{ID}$ may be a higher-layer parameter, e.g., a Data-scrambling-Identity (i.e., a dataScramblingIdentityPUSCH) as defined in 3GPP TS 38.211, v15.1.0 or later version. Data-scrambling-Identity is not used in later version, and dataScramblingIdentityPUSCH is used instead. Optionally, the initialized sequence may be represented as a function of the configurable parameter $n_{ID}$ using the following formula:

$$c_{init} = n_{RNTI} \cdot 2^{15} + n_{ID}.$$

That is, the initialized sequence may satisfy the above formula, where $c_{init}$ is the initialized sequence, $n_{ID} \in \{0,1, \ldots, 1023\}$ is configured by higher-layer signaling, for example, given by a higher-layer parameter, e.g., $n_{ID} \in \{0,1, \ldots, 1023\}$ equals the higher-layer parameter. For example, the higher-layer parameter may be the Data-scrambling-Identity (i.e., the dataScramblingIdentityPUSCH), and $n_{RNTI}$ corresponds to a RNTI associated with a PUSCH transmission, e.g., the PUSCH to be transmitted from the UE to the base station as described above.

As discussed at step 118, when the first format of DCI is detected, data received (e.g., a PDSCH received by a UE from a base station) may be scrambled by a sequence that is initialized with a configurable parameter. The sequence may be generated based on an initialized sequence that is determined based on the configurable parameter. In one embodiment, the initialized sequence may be a function of the configurable parameter, i.e. $n_{ID}$, where $n_{ID} \in \{0,1, \ldots, 1023\}$ is indicated by a higher-layer parameter, e.g., $n_{ID} \in \{0,1, \ldots, 1023\}$ equals the higher-layer parameter. For example, the higher-layer parameter may be Data-scrambling-Identity as defined in 3GPP TS 38.211 v15.1.0 or later version (i.e., dataScramblingIdentityPDSCH). Data-scrambling-Identity is not used in later version, instead, dataScramblingIdentityPDSCH is used, e.g., as defined in 3GPP TS 38.211 v15.2.0. Optionally, the initialized sequence may be represented as a function of the configurable parameter $n_{ID}$ using the following formula:

$$c_{init} = n_{RNTI} \cdot 2^{15} + q \cdot 2^{14} + n_{ID}.$$

That is, the initialized sequence may satisfy the above formula, where $c_{init}$ is the initialized sequence, $n_{ID} \in \{0,1, \ldots, 1023\}$ is configured by higher-layer signaling, for example, given by a higher-layer parameter, e.g., $n_{ID} \in \{0,1, \ldots, 1023\}$ equals the higher-layer parameter. For example, the higher-layer parameter may be Data-scrambling-Identity (i.e., the dataScramblingIdentityPDSCH), and $n_{RNTI}$ corresponds to a RNTI associated with a PDSCH transmission, e.g., the PDSCH received by the UE. $q \in \{0,1\}$ is a codeword index. Up to two codewords may be transmitted in PDSCH. $q=0$ in the case of a single codeword transmission.

Optionally, step 102 may be performed after a radio resource control (RRC) configuration procedure is performed.

Optionally, regarding the base station, the method may comprise:

sending a first format of downlink control information (DCI) in UE specific search space with CRC scrambled by a UE ID;

performing one or more of the following when the first format of DCI is sent in UE specific search space with CRC scrambled by a UE ID:

receiving, from a UE, a reference signal for data in line with the sent first format of DCI(or, a reference signal for data scheduled by the sent first format of DCI), wherein a sequence of the reference signal is associated with an initialized sequence based on a configurable parameter, sent to the UE, corresponding to a scrambling ID;

transmitting, to a UE, a reference signal for data in line with the sent first format of DCI (or, a reference signal for data scheduled by the sent first format of DCI), wherein a sequence of the reference signal is associated with an initialized sequence based on a configurable parameter, sent to the UE, corresponding to a scrambling ID (SCID for short, may be presented as nSCID);

receiving, from a UE, data in line with the sent first format of DCI (or, data scheduled by the sent first format of DCI), wherein the data is scrambled by a sequence which is initialized with a configurable parameter, sent to the UE; and transmitting, to a UE, data in line with the sent first format of DCI (or, data scheduled by the sent first format of DCI), wherein the data is scrambled by a sequence which is initialized with a configurable parameter, sent to the UE.

Furthermore, the method may comprise performing one or more of the following when the first format of DCI is not sent in UE specific search space with CRC scrambled by the UE ID:

receiving, from a UE, a reference signal for data in line with the sent first format of DCI (or, a reference signal for data scheduled by the sent first format of DCI), wherein a sequence of the reference signal is associated with an initialized sequence based on a cell ID;

transmitting, to a UE, a reference signal for data in line with the sent first format of DCI (or, a reference signal for data scheduled by the sent first format of DCI), wherein a sequence of the reference signal is associated with an initialized sequence based on a cell ID;

receiving, from a UE, data in line with the sent first format of DCI (or, data scheduled by the sent first format of DCI), wherein the data is scrambled by a sequence which is initialized with a cell ID; and transmitting, to a UE, data in line with the sent first format of DCI (or, data scheduled by the sent first format of DCI), wherein the data is scrambled by a sequence which is initialized with a cell ID.

Figure 2:
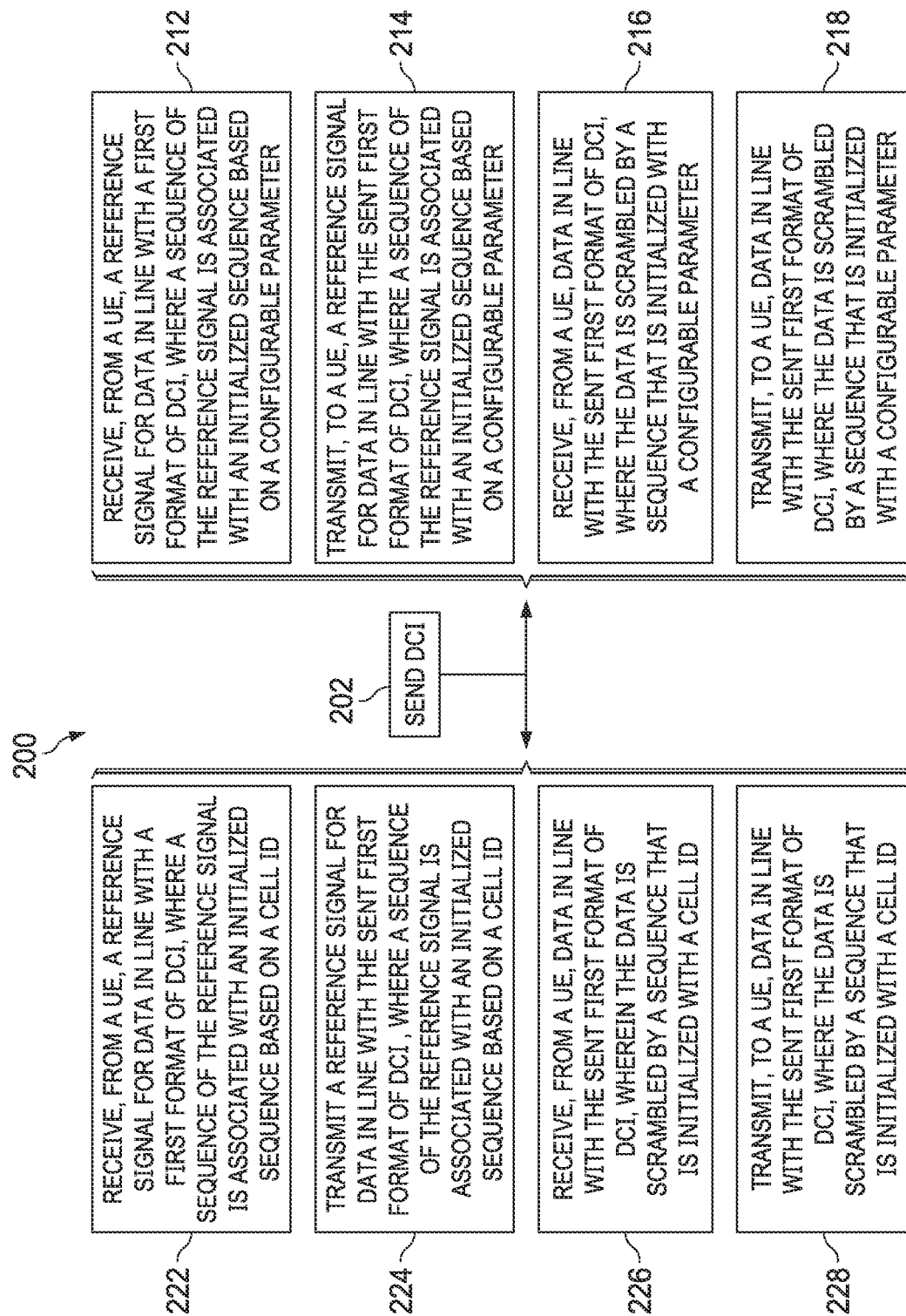
FIG. 2 illustrates a flowchart of another embodiment method for wireless communications.

FIG. 2 illustrates a flowchart of an embodiment method 200 for wireless communication. The method 200 may be indicative of operations by a base station in a wireless network. As shown, at step 202, the base station sends DCI to UEs. In one embodiment, the base station may send DCI having a first format of DCI (also referred to as DCI in a first format of DCI) in a UE specific search space with CRC scrambled by a UE ID of a UE. In another embodiment, the DCI may be in a format that is different from the first format. In yet another embodiment, the DCI may not be sent in a UE specific search space. For example, the DCI may be sent in a common search space.

The method 200 may include one or more of steps 212, 214, 216 and 218 when the DCI having the first format is sent in the UE specific search space with the CRC scrambled by the UE ID. At step 212, the base station receives, from a UE addressed by the DCI, a reference signal for data (e.g., a DMRS for a PUSCH) in line with the sent DCI in the first format of DCI (or, a reference signal for data scheduled by the sent DCI in the first format of DCI), where a sequence of the reference signal is associated with an initialized sequence based on a configurable parameter. The configurable parameter may be sent to the UE by the base station or another base station. The configurable parameter may correspond to a scrambling ID (SCID). Optional, the sequence of the reference signal associated with the initialized sequence may be generated based on the initialized sequence, and the initialized sequence may be generated based on the configurable parameter.

At step 214, the base station transmits, to a UE addressed by the DCI, a reference signal for data (e.g., a DMRS for a PDSCH) in line with the sent DCI having the first format (or, a reference signal for data scheduled by the sent DCI having the first format), where a sequence of the reference signal is associated with an initialized sequence based on a configurable parameter. The configurable parameter may be sent to the UE by the base station or another base station. The configurable parameter corresponds to a scrambling ID, represented as $n_{SCID}$. Optionally, the sequence of the reference signal associated with the initialized sequence may be generated based on the initialized sequence, and the initialized sequence may be generated based on the configurable parameter.

At step 216, the base station receives, from a UE addressed by the DCI, data (e.g., a PUSCH) in line with the sent DCI having the first format (or, data scheduled by the sent DCI having the first format), where the data is scrambled by a sequence that is initialized with a configurable parameter. The configurable parameter may be sent to the UE by a base station.

At step 218, the base station transmits, to a UE addressed by the DCI, data (e.g., a PDSCH) in line with the sent DCI having the first format (or, data scheduled by the sent DCI having the first format), where the data is scrambled by a sequence that is initialized with a configurable parameter. The configurable parameter may be sent to the UE by a base station.

Furthermore, the method 200 may include one or more of steps 222, 224, 226 and 228 when the first format of DCI is not sent in a UE specific search space with CRC scrambled by a UE ID. As shown, at step 222, the base station receives, from a UE addressed by the DCI, a reference signal for data (e.g., a DMRS for a PUSCH) in line with the sent DCI having the first format (or, a reference signal for data scheduled by the sent DCI having the first format), where a sequence of the reference signal is associated with an initialized sequence based on a cell ID. For example, the sequence of the reference signal may be generated based on the initialized sequence, and the initialized sequence may be generated based on the cell ID. The cell ID may identify a cell, for example, a cell serving the UE.

At step 224, the base station transmits, to a UE addressed by the DCI, a reference signal for data (e.g., a DMRS for a PDSCH) in line with the sent DCI having the first format (or, a reference signal for data scheduled by the sent DCI having the first format), where a sequence of the reference signal is associated with an initialized sequence based on a cell ID. For example, the sequence of the reference signal may be generated based on the initialized sequence, and the initialized sequence may be generated based on the cell ID. The cell ID may identify a cell, for example, a cell serving the UE.

At step 226, the base station receives, from a UE addressed by the DCI, data (e.g., a PUSCH) in line with the sent DCI having the first format (or, data scheduled by the sent DCI having the first format), where the data is scrambled by a sequence that is initialized with a cell ID.

At step 228, the base station transmits, to a UE addressed by the DCI, data (e.g., a PDSCH) in line with the sent DCI having the first format (or, data scheduled by the sent DCI having the first format), where the data is scrambled by a sequence that is initialized with a cell ID.

In some embodiments, after RRC configuration, if a PUSCH and/or PDSCH of a UE is scheduled by DCI format 0_0 or DCI format 1_0 in common search space, that is, a PUSCH of a UE is scheduled by a DCI having a DCI format 0_0 (also referred to as DCI in a DCI format 0_0) in a common search space and/or a PDSCH of the UE is scheduled by a DCI having a DCI format 1_0 in a common search space, the UE may assume that $n_{SCID}=0$ and $N_{ID}^{nSCID}=N_{ID}^{cell}$. $N_{ID}^{cell}$ represents a cell ID. For example, the UE may be pre-configured to set $n_{SCID}$ to be equal to 0 if a PUSCH of the UE is scheduled by a DCI having a DCI format 0_0 in a common search space, or, a PDSCH of the UE is scheduled by a DCI having a DCI format 1_0 (also referred to as DCI in a DCI format 1_0) in a common search space.

In some embodiments, after RRC configuration or reconfiguration, if a PUSCH/PDSCH of a UE is scheduled by DCI format 0_0 or DCI format 1_0 in UE specific search space and the PDSCH and/or PUSCH is scheduled by PDCCH with CRC scrambled by C-RNTI or CS-RNTI, that is, a PUSCH of a UE is scheduled by a DCI having a DCI format 0_0 in a UE specific search space, and/or, a PDSCH of the UE is scheduled by a DCI having a DCI format 1_0 in a UE specific search space, and the PDSCH and/or PUSCH is scheduled by a PDCCH with CRC scrambled by the C-RNTI or the CS-RNTI, the UE may determine that a configurable parameter $N_{ID}^{NScID}$ corresponding to $n_{SCID}=0$ (i.e., $N_{ID}^{nSCID}=N_{ID}^{0}$) is used to initialize a sequence for scrambling or descrambling signals. That is, the UE may assume that an SCID (represented by $n_{SCID}$) equal to 0 is transmitted. The terms of "SCID" and "DMRS scrambling ID" are used interchangeably. As a result, a $N_{ID}^{nSCID}$ where $n_{SCID}=0$ will be used. In some embodiments, after the RRC configuration or reconfiguration is performed, the latest configurable parameter corresponding to DMRS scrambling ID 0 before the RRC configuration or reconfiguration may be used.

When a PUSCH of a UE is scheduled by a DCI having a DCI format 0_0 in a UE specific search space with CRC scrambled by a C-RNTI or a CS-RNTI, and/or, a PDSCH of the UE is scheduled by a DCI having a DCI format 1_0 in a UE specific search space with CRC scrambled by the C-RNTI or the CS-RNTI, because a DCI format for fallback, e.g., the DCI format 0_0 or the DCI format 1_0, may not include information about $n_{SCID}$, the UE may determine by default that $n_{SCID}=0$. For example, the UE may be pre-configured with a default value for $n_{SCID}$ (e.g., $n_{SCID}=0$) when the DCI format 0_0 or the DCI format 1_0 is used.

In a case where a PDSCH of a UE is scheduled by a PDCCH of format 1_0 in a UE specific search space (USS) with CRC scrambled by a C-RNTI or a CS-RNTI, or where a PUSCH of a UE is scheduled by a PDCCH of format 0_0 in a USS with CRC scrambled by a C-RNTI or a CS-RNTI, a configurable parameter corresponding to a DMRS scrambling ID will be used to initialize a sequence for scrambling a reference signal for the PDSCH or PUSCH. If a PUSCH/PDSCH of a UE is scheduled by DCI format 0_0 or DCI format 1_0, that is, a PUSCH of a UE is scheduled by the DCI format 0_0 in a USS with CRC scrambled by a C-RNTI or a CS-RNTI, and/or, a PDSCH of the UE is scheduled by the DCI format 1_0 in a USS with CRC scrambled by the C-RNTI or the CS-RNTI, the UE may assume (or determine according to a predetermined configuration) that a first DMRS scrambling ID is configured, i.e., $n_{SCID}=0$ and $N_{ID}^{nSCID}=N_{ID}^{0}$, where $N_{ID}^{0}$ is given by a higher-layer parameter DL-DMRS-Scrambling-ID (i.e., a scramblingID0), if provided. Otherwise, $n_{SCID}=0$ and $N_{ID}^{nSCID}=N_{ID}^{cell}$. For example, if the DCI format 0_0 or DCI format 1_0 is not transmitted in a USS (e.g., if the DCI format 0_0 or DCI format 1_0 is transmitted in a common search space), $n_{SCID}=0$ and $N_{ID}^{nSCID}=N_{ID}^{cell}$.

In some embodiments, an initialized sequence $c_{init}$ for generating a sequence of a PDSCH DMRS (i.e., a DMRS for a PDSCH) may be obtained using:

$$c_{init}=(2^{17}(14n_{s,f}^{\mu}+l+1)(2N_{ID}^{nSCID}+1)+2N_{ID}^{nSCID}) \bmod 2^{31},$$

that is, the initialized sequence may satisfy the above formula. In this formula, l is the OFDM symbol number within a slot, and $n_{s,f}^{\mu}$ is a number of slots (that is, a slot number) within a frame. Optional, $n_{SCID}\in\{0,1\}$, $N_{ID}^{nSCID}\in\{0,1,\ldots,65535\}$ may be given by a higher-layer parameter DL-DMRS-Scrambling-ID (i.e. scramblingID0 or scrambling ID1), if provided, and the PDSCH is scheduled by a PDCCH with a DCI format 1_1 and with CRC scrambled by a C-RNTI or a CS-RNTI. In another case, $n_{SCID}=0$ and $N_{ID}^{nSCID}\{0,1,\ldots,65535\}$ may be given by a higher-layer parameter DL-DMRS-Scrambling-ID (i.e. scramblingID0), if provided, and the PDSCH is scheduled by a PDCCH with a DCI format 1_0 and with CRC scrambled by a C-RNTI or a CS-RNTI. Otherwise, $n_{SCID}=0$, and $N_{ID}^{nSCID}=N_{ID}^{cell}$. For example, if the PDSCH is not scheduled by a PDCCH with a DCI format 1_0 or DCI format 1_1, or the PDCCH does not have CRC scrambled by a C-RNTI or a CS-RNTI, $n_{SCID}=0$, and $N_{ID}^{nSCID}=N_{ID}^{cell}$.

In some embodiments, an initialized sequence $c_{init}$ for initializing a sequence of a PUSCH DMRS (i.e., a DMRS for a PUSCH) may be obtained using:

$$c_{init}=(2^{17}(N_{symb}^{slot}n_{s,f}^{\mu}+l+1)(2N_{ID}^{nSCID}+1)+2N_{ID}^{nSCID}+n_{SCID}) \bmod 2^{31},$$

that is, the initialized sequence may satisfy the above formula. In this formula, l is a number of OFDM symbols within a slot, $n_{s,f}^{\mu}$ is a number of slots within a frame, and $N_{symb}^{slot}$ is a number of symbols per slot. Optionally, $n_{SCID}\in\{0,1\}$, and $N_{ID}^{nSCID}\in\{0,1,\ldots,65535\}$ is given by a higher-layer parameter UL-DMRS-Scrambling-ID (i.e. scramblingID0 or scramblingID1), if provided, and the PUSCH is not a msg3 PUSCH and is not scheduled by a PDCCH with a DCI format 0_1 and CRC scrambled by UE ID, e.g., a C-RNTI or a CS-RNTI or MCS-C-RNTI or SP-CSI-RNTI. In another case, $n_{SCID}=0$, $N_{ID}^{nSCID}\in\{0,1,\ldots,65535\}$ is given by a higher-layer parameter UL-DMRS-Scrambling-ID (i.e. scramblingID0) if provided, and the PUSCH is not an msg3 PUSCH and is not scheduled by a PDCCH with a DCI format 0_0 and with CRC scrambled by a UE ID, e.g., C-RNTI or a CS-RNTI or MCS-C-RNTI or SP-CSI-RNTI. Otherwise, $n_{SCID}=0$ and $N_{ID}^{nSCID}=N_{ID}^{cell}$. For example, if the PUSCH is not scheduled by a PDCCH with a DCI format 0_1 or DCI format 0_0, or the PDCCH does not have CRC scrambled by a UE ID, e.g., C-RNTI or a CS-RNTI or MCS-C-RNTI or SP-CSI-RNTI, $n_{SCID}=0$ and $N_{ID}^{nSCID}=N_{ID}^{cell}$.

In some embodiments, an initialized sequence represented as $c_{init}$ for generating a sequence of a PDSCH DMRS (i.e., a DMRS for a PDSCH) may be obtained using: $c_{init}=(2^{17}(N_{symb}^{slot}n_{s,f}^{\mu}+l+1)(2N_{ID}^{nSCID}+1)+2N_{ID}^{nSCID}+n_{SCID}) \bmod 2^{31}$. In other words, the initialized sequence may satisfy the above formula. In this formula, l is the OFDM symbol number within a slot, $n_{s,f}^{\mu}$ is the slot number within a frame, and $N_{symb}^{slot}$ is a number of symbols per slot; and $N_{ID}^{0}, N_{ID}^{1}\in\{0,1,\ldots,65535\}$ may be given by higher-layer parameters, e.g., scramblingID0 and scramblingID1, respectively, where the higher-layer parameters may be given in a field, i.e., an information element (IE), for example, in the DMRS-DownlinkConfig IE if provided and the PDSCH is scheduled by PDCCH using DCI format 1_1 (in other words, DCI of DCI format 1_1) with CRC scrambled by C-RNTI, MCS-C-RNTI, or CS-RNTI;

$N_{ID}^{0}\in\{0,1,\ldots,65535\}$ may be given by a higher-layer parameter, e.g. scramblingID0, where the higher-layer parameter may be given in a field, i.e., an information element (IE), for example, in the DMRS-DownlinkConfig IE if provided and the PDSCH is scheduled by PDCCH using DCI format 1_0 with the CRC scrambled by C-RNTI, MCS-C-RNTI, or CS-RNTI, and the PDSCH is not scheduled by PDCCH using DCI format 1_0 (in other words, DCI of DCI format 1_1) in a common search space;

Otherwise, $N_{ID}^{nSCID}=N_{ID}^{cell}$.

The quantity represented as $n_{SCID}\in\{0,1\}$ may be given by a DMRS sequence initialization field, in DCI associated with a PDSCH transmission if DCI format is used, otherwise, $n_{SCID}=0$.

In some embodiments, an initialized sequence represented as $c_{init}$ for initializing a sequence of a PUSCH DMRS (i.e., a DMRS for a PUSCH) may be obtained using: $c_{init}=(2^{17}(N_{symb}^{slot}n_{s,f}^{\mu}+l+1)(2N_{ID}^{nSCID}+1)+2N_{ID}^{nSCID}+n_{SCID}) \bmod 2^{31}$. In other words, the initialized sequence satisfies the above formula. In this formula, l is the OFDM symbol number within a slot, $n_{s,f}^{\mu}$ is the slot number within a frame, and, $N_{symb}^{slot}$ is a number of symbols per slot; and $N_{ID}^{0}, N_{ID}^{1}\in\{0,1,\ldots,65535\}$ may be given by higher-layer parameters, e.g. scramblingID0 and scramblingID1, respectively, where the higher-layer parameters may be given in a filed, i.e., information element (IE), for example, in the DMRS-UplinkConfig IE if provided and the PUSCH is scheduled by DCI of DCI format 0_1 or by a Type 1 PUSCH transmission with a configured grant;

$N_{ID}^{0}\in\{0,1,\ldots,65535\}$ may be given by a higher-layer parameter, e.g. scramblingID0, where the higher-layer parameter may be given in a filed, i.e., information element (IE), for example, in the DMRS-UplinkConfig IE if provided and the PUSCH is scheduled by DCI of DCI format 0_0 with CRC scrambled by C-RNTI, MCS-C-RNTI, or CS-RNTI; and the PUSCH is not scheduled by DCI of DCI format 0_0 in a common search space;

Otherwise, $N_{ID}^{nSCID}=N_{ID}^{cell}$.

The quantity $n_{SCID}\in\{0,1\}$ may be indicated by a field, e.g. the DMRS initialization field, if present, in DCI associated with the PUSCH if DCI format 0_1 is used, otherwise, $n_{SCID}=0$.

In some embodiments, if transform precoding for PUSCH is enabled, a reference-signal sequence which is represented as r(n) for a reference signal for the PUSCH shall be $$r(n)=r_{u,v}^{(\alpha,\delta)}(n)$$

generated according to $n=0,1,\ldots,M_{sc}^{PUSCH}/2^{\delta}-1$. That is, the reference-signal sequence satisfies this formula. In this formula, $r_{u,v}^{(\alpha,\delta)}(m)$ is a low-PAPR sequence as defined below with $\delta=1$ and $\alpha=0$ for a PUSCH transmission dynamically scheduled by DCI. The low-PAPR sequence represented as $r_{u,v}^{(\alpha,\delta)}(m)$ may be defined by a cyclic shift represented as $\alpha$ of a base sequence represented as $\bar{r}_{u,v}(m)$ according to $r_{u,v}^{(\alpha,\delta)}(m)=e^{j\alpha m}\bar{r}_{u,v}(m)$, $0 \le m \le M_{ZC}$ (that is, the low-PAPR PAPR sequence satisfies this formula), where $M_{ZC}=dN_{sc}^{FB}/2^{\delta}$ represents the length of the sequence. Multiple sequences are defined from a single base sequence through different values of $\alpha$ and $\delta$.

The base sequences represented as $\bar{r}_{u,v}(m)$ may be divided into groups, where $u \in \{0,1, \ldots, 29\}$ represents the group number and v represents the base sequence number within the group, such that each group contains one base sequence (v=0) of each length $M_{ZC}=dN_{sc}^{RB}/2^{\delta}$, $\frac{1}{2} \le d/2^{\delta} \le 5$, and two base sequences (v=0,1) of each length $M_{ZC}=dN_{sc}^{RB}/2^{\delta}$, $6 \le d/2^{\delta}$. The definition of the base sequence represented as $\bar{r}_{u,v}(0), \ldots, \bar{r}_{u,v}(M_{ZC}-1)$ depends on the sequence length represented as $M_{ZC}$. The sequence group, represented as u, satisfies:

$$u = (f_{gh} + n_{ID}^{RS}) \bmod 30,$$

where $n_{ID}^{RS}$ may be given by:
$n_{ID}^{RS}=n_{ID}^{PUSCH}$ if $n_{ID}^{PUSCH}$ is configured by a higher-layer parameter, e.g. the nPUSCH-Identity in the DMRS-UplinkConfig IE and the PUSCH is not an msg3 PUSCH, and the transmission is not scheduled by DCI of DCI format 0_0 in a common search space. An msg3 PUSCH is a PUSCH message that is sent by a UE as part of a random access procedure after the UE sends a preamble message (msg 1) and receives a random access response (RAR) message (msg2) from the network. Details of the msg3 PUSCH can be found in TS 38.213, V15.1.0 or later version.
Otherwise, $n_{ID}^{RS}=N_{ID}^{cell}$.
In $$u = (f_{gh} + n_{ID}^{RS}) \bmod 30,$$

$f_{gh}$ and the sequence number represented as v may be given by:
if neither group, nor sequence hopping shall be used, $f_{gh}=0$ $v=0$;

if group hopping but not sequence hopping shall be used, $f_{gh}=(\Sigma_{j=0}^{7} 2^j c(8(N_{symb}^{slot} n_{s,f}^{\mu}+l)+j)) \bmod 30$ $v=0$, where the pseudo-random sequence represented as c(i) may be initialized with $c_{init}=\lfloor n_{ID}^{RS}/30 \rfloor$ at the beginning of each radio frame. The pseudo-random sequence in this application, represented as c(i), may be defined by a length-31 Gold sequence. The output sequence c(i) of length represented as $M_{PN}$, where i=0, 1, . . . , $M_{RN}-1$, may be defined by $c(i)=(x_1(i+N_c)+x_2(i+N_C)) \bmod 2$ $x_1(i+31)=(x_1(i+3)+x_1(i)) \bmod 2$ $x_2(i+31)=(x_2(i+3)+x_2(i+2)+x_x(i+1)+x_x(i)) \bmod 2,$ where $N_C=1600$ and the first m-sequence represented as $x_1(i)$ may be initialized with $x_1(0)=1$, $x_1(i)=0$, n=1, 2, . . . , 30. The initialization of the second m-sequence, represented as $x_2(i)$, is denoted by $c_{init}=\Sigma_{p=0}^{30} x_2(p) \cdot 2^p$ with a value depending on the application of the sequence.

if sequence hopping but not group hopping shall be used, $f_{gh} = 0$ $v = \begin{cases} c(N_{symb}^{slot} n_{s,f}^{\mu}+l) & \text{if } M_{ZC} \ge 6N_{sc}^{RB} \\ 0 & \text{otherwise} \end{cases}$, where the pseudo-random sequence represented as c(i) may be initialized with $c_{init}=n_{ID}^{RS}$ at the beginning of each radio frame.

The quantity represented as l above is the OFDM symbol number except for the case of double-symbol DMRS, in which case l is the OFDM symbol number of the first symbol of the double-symbol DMRS.

Figure 3:
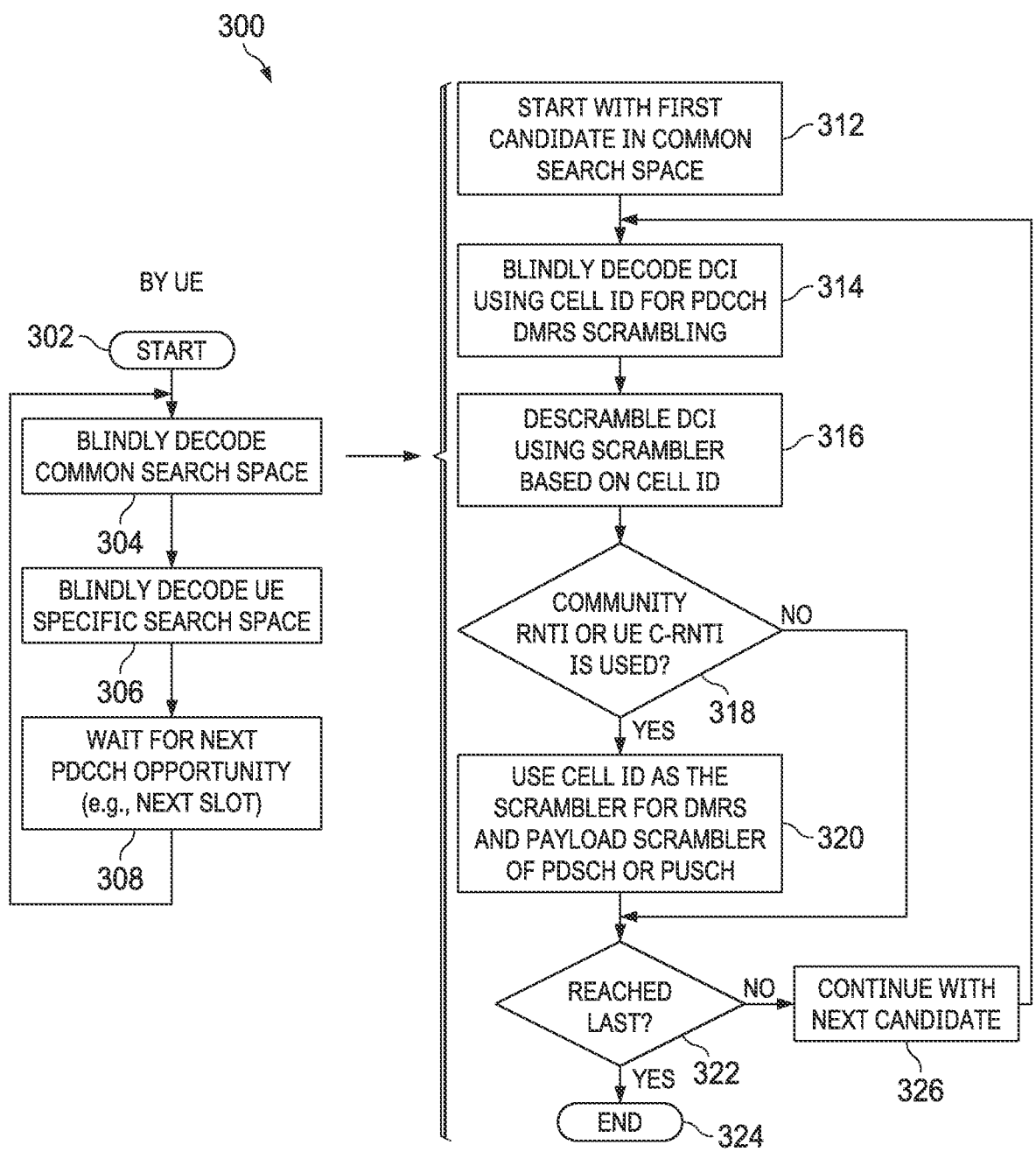
FIG. 3 illustrates a flowchart of yet another embodiment method for wireless communication.

FIG. 3 illustrates a flowchart of an embodiment method 300 for wireless communication. A UE may perform the method 300 for receiving and detecting DCI. As shown, the method 300 starts at step 302, and proceeds to step 304. At step 304, the UE blindly decodes a common search space. At step 306, the UE blindly decodes a UE specific search space. At step 308, the UE waits for the next PDCCH opportunity (e.g., the next slot). The UE then goes back to step 304 to continue to blindly decode monitored search spaces in the next PDCCH opportunity. Alternatively, the UE may perform step 306 before step 304, or, perform step 304 before step 306, or, perform step 304 and step 306 at the same time. It should be noted that the order of step 304 and step 306 is not limited.

In some embodiments, the UE may perform steps 312-326 at step 304 for blindly decoding the common search space. As shown, at step 312, the UE starts decoding with the first candidate in the common search space. At step 314, the UE blindly decodes DCI using a cell ID for PDCCH DMRS descrambling. At step 316, the method descrambles the DCI using a scrambler that is based on the cell ID. The scrambler may be referred to as a unit/module for scrambling/descrambling signals and channels. The scrambler may also be referred to as a process/procedure of scrambling/descrambling using a scrambling sequence. The scrambler may be initialized using the cell ID to generate an initialized sequence, and generate a scrambling sequence using the initialized sequence to descramble the DCI. At step 318, the UE determines whether a common (also referred to as community) ID (also referred to as RNTI) or a UE ID is used in scrambling CRC of the DCI. A common ID may be common to a group of UEs. A common ID may be referred to as a cell specific RNTI or ID or, an area specific RNTI, or, a group specific RNTI. A common ID may include a group specific RNTI, or a cell or area specific RNTI, such as a SI-RNTI, a P-RNTI, a TC-RNTI, a RA-RNTI, an INT-RNTI, a SFI-RNTI, or, a TPC-RNTI etc. A UE ID may be referred to as a UE specific RNTI or ID, and may include a C-RNTI, or, a CS-RNTI, or a MCS-C-RNTI or a SP-CSI-RNTI, etc. FIG. 3 shows merely an optional way at step 318, where the UE determines whether a community RNTI or a UE C-RNTI is used in scrambling CRC of the DCI. The step 318 includes that the UE determines whether CRC check with the common ID or the UE ID is successful. If the CRC check the common ID or the UE ID is successful, the UE proceeds to step 320, where the UE uses the cell ID to perform any one or a combination of initializing a sequence for descrambling DMRSs associated with a PDSCH, initializing a sequence for scrambling DMRSs associated with a PUSCH, initializing a sequence for descrambling a PDSCH, or initializing a sequence for scrambling a PUSCH. For example, the UE may scramble a DMRS associated with a PUSCH using the cell ID, or descramble a DMRS associated with a PDSCH using the cell ID. The UE may scramble a PUSCH (UL) using the cell ID after detecting fallback DCI in the common search space with CRC scrambled by the cell ID or the UE ID. The UE may descramble a PDSCH (DL) using the cell ID after detecting fallback DCI in the common search space with CRC scrambled by the cell ID or the UE ID. As one illustrative optional way, at step 320, the UE uses the cell ID as the scrambler for DMRS and payload scrambler of PDSCH or PUSCH (i.e., the cell ID is used to initialize the scrambler for generating a scrambling sequence for scrambling or descrambling the DMRS and the payload). Then the method proceeds to step 322. Otherwise, for example, if the UE determines, at step 318, that the CRC check is not successful, and neither the community (common) RNTI nor the UE C-RNTI is used, the UE proceeds to step 322. The common search space may include multiple common search spaces or search space sets. In this case, at step 322, the method determines whether it reaches the last candidate in the last common search space (e.g., the last candidate in the last common search space set) or the maximum number of candidates supported by the UE or configured to the UE. In some embodiments, a UE may not need to blindly decode all the PDCCH candidates in a given search space or search space set if the UE has already successfully decoded a configurable number of PDCCHs. Blind detection is the process whereby the UE attempts to determine whether there are any PDCCHs addressed to the UE, and is based on search spaces. There can be multiple common and/or UE-specific search spaces in a single CORESET configured to a UE. The CCE is the unit upon which the search spaces for blind decoding are defined. In NR, each CCE consists of 6 REGs and each REG consists of one resource block in one OFDM symbol. A search space set at a certain aggregation level of CCEs e.g. 1, 2, 4, 8 or 16 is formed of PDCCH candidates of the same aggregation level of contiguous CCEs. A PDCCH candidate essentially refers to a set of contiguous CCEs e.g., 1, 2, 4, 8 or 16 in which the network may transmit a PDCCH.

If the current candidate is the last one in the common search space or the maximum number of candidates supported by the UE or configured to the UE is reached, the blind decoding of the common search space ends at step 324. If the candidate is not the last one or the maximum number of candidates supported by the UE or configured to the UE is not reached, the UE proceeds to step 326 to continue decoding with the next candidate. The UE then goes back to step 314 to perform the decoding of the next candidate. In some embodiments, a UE may stop the blind decoding of search spaces if it has already successfully decoded a configurable number of PDCCHs.

Figure 4:
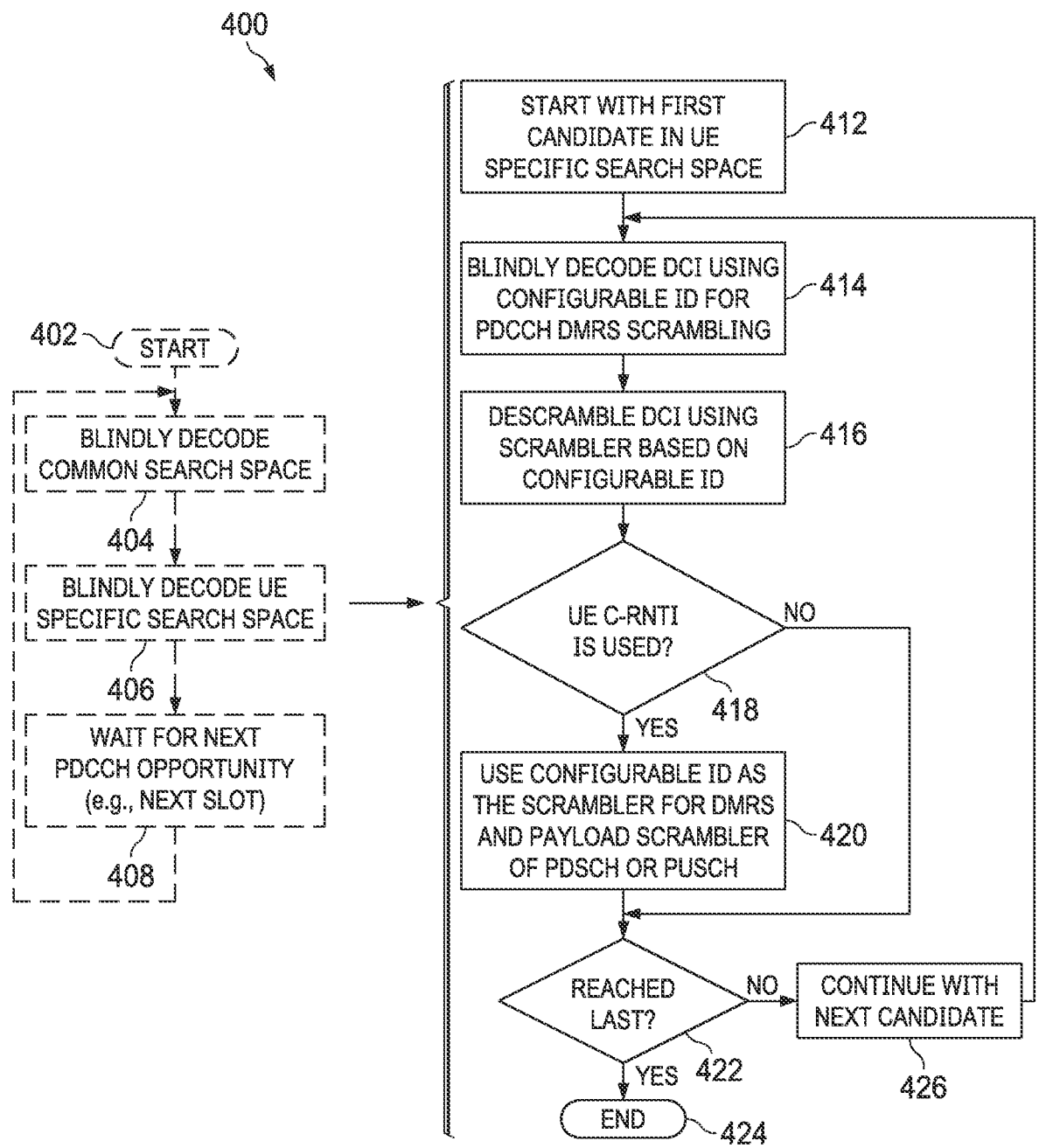
FIG. 4 illustrates a flowchart of yet another embodiment method for wireless communication.

FIG. 4 illustrates a diagram of yet another embodiment method 400 for wireless communication. The method 400 may be performed by a UE for receiving DCI. Steps 402-408 are similar to steps 302-308 in FIG. 3. As shown, the method 400 starts at step 402, and proceeds to step 404. At step 404, the UE blindly decodes a common search space. At step 406, the UE blindly decodes a UE specific search space. At step 408, the UE waits for the next PDCCH opportunity (e.g., the next slot). The UE then goes back to step 404 to continue to blindly decode monitored search spaces or search space sets in the next PDCCH opportunity (also referred to as occasion). Alternatively, the UE may perform step 406 before step 404, or, perform step 404 before step 406, or, perform step 404 and step 406 at the same time. It should be noted that the order of step 404 and step 406 is not limited.

In some embodiments, the UE may perform steps 412-426 at step 406 for blindly decoding the UE specific search space (set). As shown, at step 412, the UE starts decoding with the first candidate in the UE specific search space (set). In one optional case, a DCI having the fallback format (also referred to as DCI in the fallback format) is detected in the USS (set). At step 414, the UE blindly decodes DCI using a configurable ID (i.e., the configurable parameter, as described with respect to FIG. 1) for PDCCH DMRS scrambling. At step 416, the UE descrambles the DCI using a scrambler that is based on a configurable ID. For example, the scrambler is initialized using the configurable ID for descrambling the DCI. The steps 414 and 416 may be performed in a different order than what is shown in FIG. 4. The UE may then perform CRC check using a UE ID to determine whether the UE ID is used to scramble CRC of the DCI. Step 418 shows an illustrative optional way, where the UE determines whether a UE C-RNTI is used in scrambling the CRC of the DCI. As discussed above, other UE IDs, such as the CS-RNTI, MCS-C-RNTI or SP-CSI-RNTI may also be used and checked. If the CRC check is successful, and the UE determines that UE ID is used for scrambling the CRC of the DCI, the UE proceeds to step 420, where the UE performs any one or a combination of using a configurable ID to initiate a sequence for descrambling DMRS for a PDSCH, using a configurable ID to initiate a sequence for scrambling DMRS for a PUSCH, using a configurable ID to initiate a sequence for descrambling a PDSCH, or using a configurable ID to initiate a sequence for scrambling a PUSCH. That is, the UE uses a configurable ID to initialize a sequence for scrambling or descrambling signals, such as the DMRSs, the PDSCH or the PUSCH. In an optional way, when the UE determines that the UE ID is used in scrambling the CRC of the DCI, while the DCI is in either a fallback format or a non-fallback format, the UE proceeds to step 420, where the UE performs any one or combination of using a configurable ID to initiate a sequence for descrambling DMRS for a PDSCH, using a configurable ID to initiate a sequence for scrambling DMRS for a PUSCH, using a configurable ID to initiate a sequence for descrambling a PDSCH, or using a configurable ID to initiate a sequence for scrambling a PUSCH. The configurable IDs to initialize a sequence for descrambling different signals, such as the DMRS associated with a PDSCH, DMRS associated with a PUSCH, the PDSCH or the PUSCH, may be the same or different. Otherwise, for example, if the CRC check is not successful, and the UE determines that the UE ID is not used, the UE proceeds to step 422. At step 422, the method determines whether it reaches the last candidate in the UE specific search space. That is, the UE checks whether the current candidate is the last one in the UE specific search space. If it reaches the last candidate or the maximum number of candidates supported by the UE or configured to the UE is reached, the blind decoding of the UE specific search space ends at step 424. If the current candidate is not the last one or the maximum number of candidates supported by the UE or configured to the UE is not reached, the UE proceeds to step 426 to continue the decoding with the next candidate in the UE specific search space. The UE then goes back to step 414 to perform the decoding of the next candidate.

Figure 5:
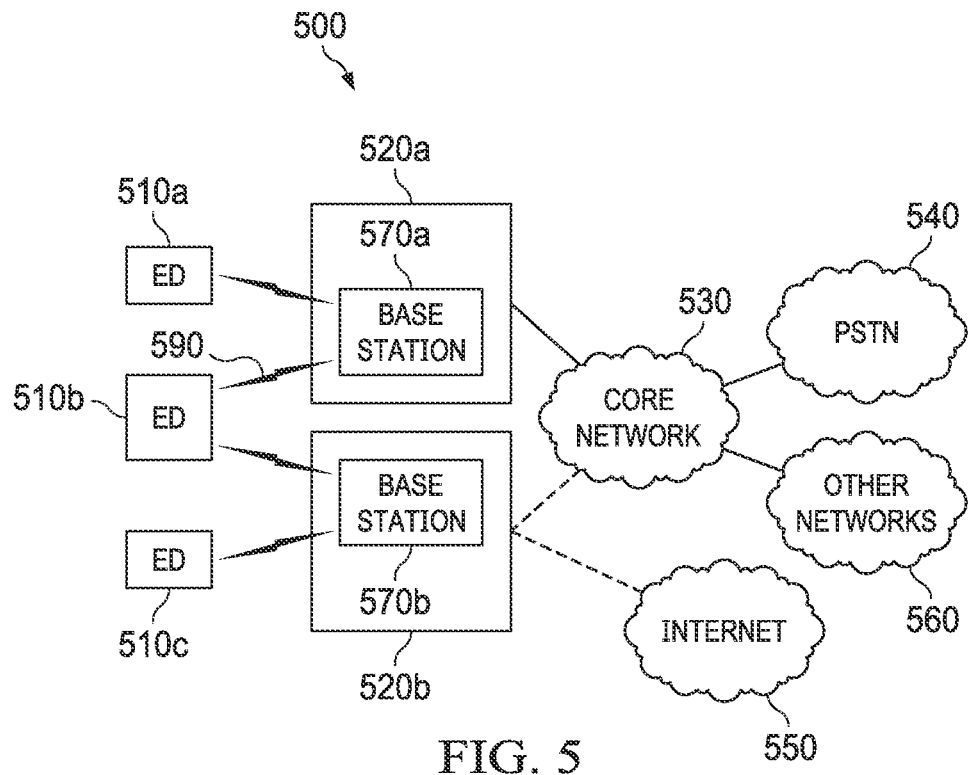
FIG. 5 illustrates a diagram of an embodiment communication system.

FIG. 5 illustrates a possible way of a communication system 500 in which embodiments of the present disclosure may be implemented. In general, the system 500 enables multiple wireless or wired elements to communicate data and other content. The purpose of the system 500 may be to provide content (voice, data, video, text) via broadcast, narrowcast, user device to user device, etc. The system 500 may operate efficiently by sharing resources such as bandwidth.

In this embodiment, the communication system 500 includes electronic devices (ED) 510a-510c, radio access networks (RANs) 520a-520b, a core network 530, a public switched telephone network (PSTN) 540, the Internet 550, and other networks 560. While certain numbers of these components or elements are shown in FIG. 5, any reasonable number of these components or elements may be included in the system 500.

The EDs 510a-510c are configured to operate, communicate, or both, in the system 500. For example, the EDs 510a-510c are configured to transmit, receive, or both via wireless communication channels. Each ED 510a-510c represents any suitable end user device for wireless operation and may include such devices (or may be referred to) as a user equipment/device (UE), wireless transmit/receive unit (WTRU), mobile station, mobile subscriber unit, cellular telephone, station (STA), machine type communication device (MTC), personal digital assistant (PDA), smartphone, laptop, computer, touchpad, wireless sensor, or consumer electronics device.

In FIG. 5, the RANs 520a-520b include base stations 570a-570b, respectively. Each base station 570a-570b is configured to wirelessly interface with one or more of the EDs 510a-510c to enable access to any other base station 570a-570b, the core network 530, the PSTN 540, the Internet 550, and/or the other networks 560. For example, the base stations 570a-570b may include (or be) one or more of several well-known devices, such as a base transceiver station (BTS), a Node-B (NodeB), an evolved NodeB (eNodeB), a Home eNodeB, a gNodeB (sometimes called a "gigabit" NodeB), a transmission point (TP), a transmit/receive point (TRP), a site controller, an access point (AP), or a wireless router. Any ED 510a-510c may be alternatively or jointly configured to interface, access, or communicate with any other base station 570a-570b, the internet 550, the core network 530, the PSTN 540, the other networks 560, or any combination of the preceding. Optionally, the system may include RANs, such as RAN 520b, where the corresponding base station 570b accesses the core network 530 via the internet 550, as shown.

The EDs 510a-510c and base stations 570a-570b are possible communication equipment that can be configured to implement some or all of the functionality and/or embodiments described herein. In the embodiment shown in FIG. 5, the base station 570a forms part of the RAN 520a, which may include other base stations, base station controller(s) (BSC), radio network controller(s) (RNC), relay nodes, elements, and/or devices. Any base station 570a, 570b may be a single element, as shown, or multiple elements, distributed in the corresponding RAN, or otherwise. Also, the base station 570b forms part of the RAN 520b, which may include other base stations, elements, and/or devices. Each base station 570a-570b may be configured to operate to transmit and/or receive wireless signals within a particular geographic region or area, sometimes referred to as a coverage area. A cell may be further divided into cell sectors, and a base station 570a-570b may, for example, employ multiple transceivers to provide service to multiple sectors. In some embodiments, a base station 570a-570b may be implemented as pico or femto nodes where the radio access technology supports such. In some embodiments, multiple-input multiple-output (MIMO) technology may be employed having multiple transceivers for each coverage area. The number of RAN 520a-520b shown is exemplary only. Any number of RAN may be contemplated when devising the system 500.

The base stations 570a-570b communicate with one or more of the EDs 510a-510c over one or more air interfaces 590 using wireless communication links e.g. RF, µWave, IR, etc. The air interfaces 590 may utilize any suitable radio access technology. For example, the system 500 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 590.

A base station 570a-570b may implement Universal Mobile Telecommunication System (UMTS) Terrestrial Radio Access (UTRA) to establish an air interface 590 using wideband CDMA (WCDMA). In doing so, the base station 570a-570b may implement protocols such as HSPA, HSPA+ optionally including HSDPA, HSUPA or both. Alternatively, a base station 570a-570b may establish an air interface 590 with Evolved UTMS Terrestrial Radio Access (E-UTRA) using LTE, LTE-A, and/or LTE-B. It is contemplated that the system 500 may use multiple channel access functionality, including such schemes as described above. Other radio technologies for implementing air interfaces include IEEE 802.11, 802.15, 802.16, CDMA7000, CDMA7000 1x, CDMA7000 EV-DO, IS-7000, IS-95, IS-856, GSM, EDGE, and GERAN. Of course, other multiple access schemes and wireless protocols may be utilized.

The RANs 520a-520b are in communication with the core network 530 to provide the EDs 510a-510c with various services such as voice, data, and other services. Understandably, the RANs 520a-520b and/or the core network 530 may be in direct or indirect communication with one or more other RANs (not shown), which may or may not be directly served by the core network 530, and may or may not employ the same radio access technology as the RAN 520a, RAN 520b or both. The core network 530 may also serve as a gateway access between (i) the RANs 520a-520b or EDs 510a-510c or both, and (ii) other networks (such as the PSTN 540, the Internet 550, and the other networks 560). In addition, some or all of the EDs 510a-510c may include functionality for communicating with different wireless networks over different wireless links using different wireless technologies and/or protocols. PSTN 540 may include circuit switched telephone networks for providing plain old telephone service (POTS). Internet 550 may include a network of computers and subnets (intranets) or both, and incorporate protocols, such as IP, TCP, or UDP. EDs 510a-510c may be multimode devices capable of operation according to multiple radio access technologies, and incorporate multiple transceivers necessary to support such.

It is contemplated that the communication system 500 as illustrated in FIG. 5 may support a New Radio (NR) cell, which may also be referred to as hyper cell. Each NR cell includes one or more TRPs using the same NR cell ID. The NR cell ID is a logical assignment to all physical TRPs of the NR cell, and may be carried in a broadcast synchronization signal. The NR cell may be dynamically configured. The boundary of the NR cell may be flexible and the system dynamically adds TRPs to or removes TRPs from the NR cell.

In one embodiment, a NR cell may have one or more TRPs within the NR cell transmitting a UE-specific data channel, which serves a UE. The one or more TRPs associated with the UE specific data channel are also UE specific and are transparent to the UE. Multiple parallel data channels within a single NR cell may be supported, with each data channel serving a different UE.

In another embodiment, a broadcast common control channel and a dedicated control channel may be supported. The broadcast common control channel may carry common system configuration information transmitted by all or partial TRPs sharing the same NR cell ID. Each UE can decode information from the broadcast common control channel in accordance with information tied to the NR cell ID. One or more TRPs within a NR cell may transmit a UE specific dedicated control channel, which serves a UE and carries UE-specific control information associated with the UE. Multiple parallel dedicated control channels within a single NR cell may be supported, with each dedicated control channel serving a different UE. The demodulation of each dedicated control channel may be performed in accordance with a UE-specific reference signal (RS), the sequence and/or location of which are linked to a UE ID or other UE specific parameters.

In some embodiments, one or more of these channels, including the dedicated control channels and the data channels, may be generated in accordance with a UE specific parameter and/or an NR cell ID, where, for example, the UE specific parameter maybe a UE ID, or, a value configured by the base station. Further, the UE specific parameter and/or the NR cell ID can be used to differentiate transmissions of the data channels and control channels from different NR cells.

An ED, such as a UE, may access the communication system 500 through at least one of the TRP within a NR cell using a UE dedicated connection ID, which allows one or more physical TRPs associated with the NR cell to be transparent to the UE. The UE dedicated connection ID is an identifier that uniquely identifies the UE in the NR cell. For example, the UE dedicated connection ID may be identified by a sequence. In some implementations, the UE dedicated connection ID is assigned to the UE after an initial access. The UE dedicated connection ID, for example, may be linked to other sequences and randomizers which are used for PHY channel generation. The UE dedicated connection ID may be an ID obtained based on configuration from the base station, through a higher layer signaling, and/or, control information.

In some embodiments, the UE dedicated connection ID remains the same as long as the UE is communicating with a TRP within the NR cell. In some embodiments, the UE can keep original UE dedicated connection ID when crossing NR cell boundary. For example, the UE can only change its UE dedicated connection ID after receiving signaling from the network.

A number of NR cells implemented in the communication system 500 may be different according to different communication scenarios. For example, FIG. 6 illustrates two neighboring NR cells in an example communication system 600, in accordance with an embodiment of the present disclosure.

Figure 6:
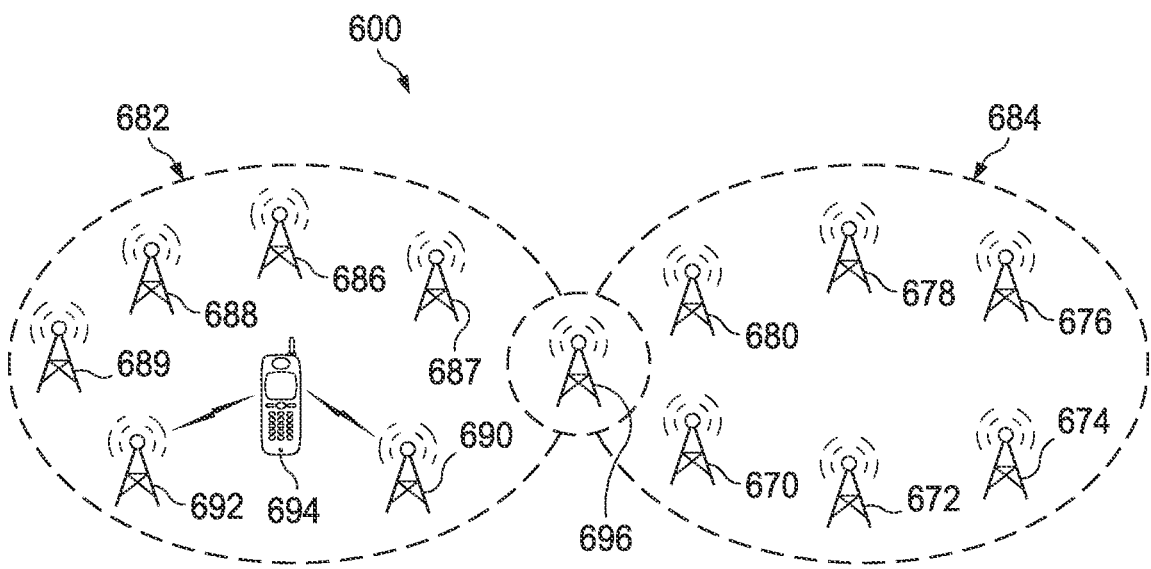
FIG. 6 illustrates a diagram of another embodiment communication system.

As illustrated in FIG. 6, NR cells 682, 684 each includes multiple TRPs that are assigned the same NR cell ID. For example, NR cell 682 includes TRPs 686, 687, 688, 689, 690, and 692, where TRPs 690, 692 communicates with an ED, such as UE 694. It is obviously understood that other TRPs in NR cell 682 may communicate with UE 694. NR cell 684 includes TRPs 670, 672, 674, 676, 678, and 680. TRP 696 is assigned to NR cells 682, 684 at different times, frequencies or spatial directions and the system may switch the NR cell ID for TRP 696 between the two NR cells 682 and 684. It is contemplated that any number (including zero) of shared TRPs between NR cells may be implemented in the system.

In one embodiment, the system dynamically updates the NR cell topology to adapt to changes in network topology, load distribution, and/or UE distribution. In some implementations, if the concentration of UEs increases in one region, the system may dynamically expand the NR cell to include TRPs near the higher concentration of UEs. For example, the system may expand NR cell to include other TRPs if the concentration of UEs located at the edge of the NR cell increases above a certain threshold. As another situation, the system may expand NR cell to include a greater concentration of UEs located between two hyper cells. In some implementations, if the traffic load increases significantly at one region, the system may also expand the NR cell associated with the region to include TRPs for the increased traffic load. For example, if the traffic load of a portion of the network exceeds a predetermined threshold, the system may change the NR cell ID of one or more TRPs that are transmitting to the impacted portion of the network.

In another embodiment, the system may change the NR cell ID associated with TRP 696 from the NR cell ID of NR cell 682 to the NR cell ID of NR cell 684. In one implementation, the system can change the association of a TRP with different NR cells periodically, such as every 1 millisecond. With such a flexible NR cell formation mechanism, all UEs can be served by the best TRPs so that virtually there are no cell edge UEs.

In yet another embodiment, the shared TRP 696 can reduce interference for UEs located at the boundary between the two NR cells 682, 684. UEs that are located near the boundaries of two NR cells 682, 684 experience less handovers because the shared TRP is associated with either NR cell at different times, frequencies or spatial directions. Further, as a UE moves between the NR cells 682, 684, the transition is a smoother experience for the user. In one embodiment, the network changes the NR cell ID of the TRP 696 to transition a UE moving between NR cells 682, 684.

Figure 7A:
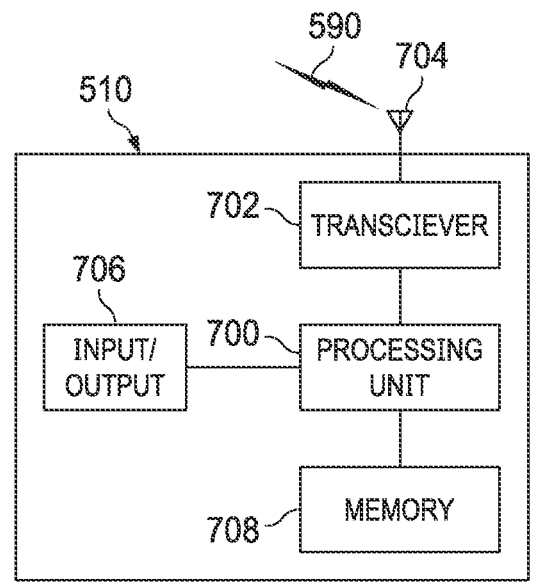
FIG. 7A illustrates a diagram of an embodiment electronic device.
Figure 7B:
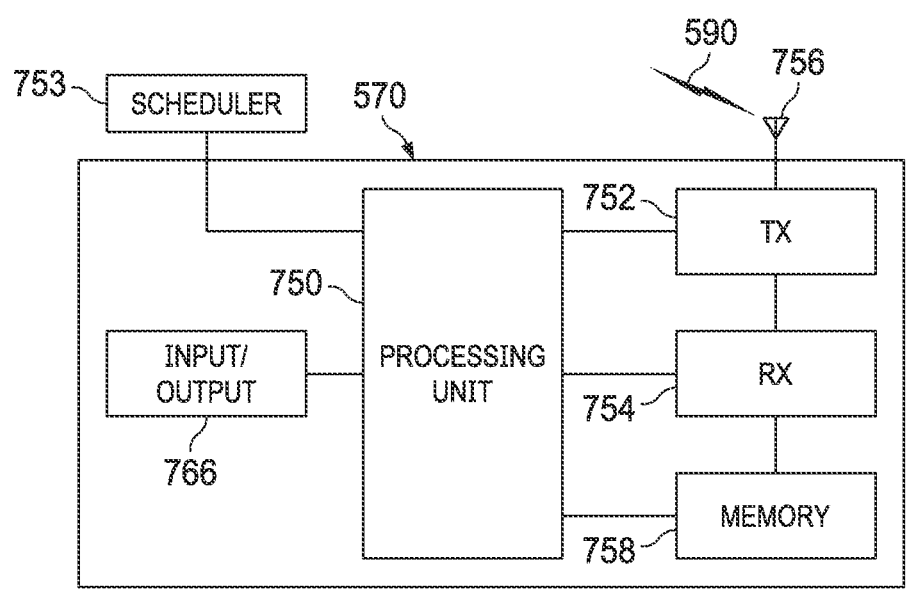
FIG. 7B illustrates a diagram of an embodiment base station.

FIGS. 7A and 7B illustrate possible devices that may implement the methods and teachings according to this disclosure. In particular, FIG. 7A illustrates an example ED 510 in FIG. 5, and FIG. 7B illustrates an example base station 570 in FIG. 5. These components could be used in the system 500 or in any other suitable system.

As shown in FIG. 7A, the ED 510 includes at least one processing unit 700. The processing unit 700 implements various processing operations of the ED 510. For example, the processing unit 700 could perform signal coding, data processing, power control, input/output processing, or any other functionality enabling the ED 510 to operate in the system 500. The processing unit 700 may also be configured to implement some or all of the functionality and/or embodiments described in more detail above. Each processing unit 700 includes any suitable processing or computing device configured to perform one or more operations. Each processing unit 700 could, for example, include a microprocessor, microcontroller, digital signal processor, field programmable gate array, or application specific integrated circuit.

The ED 510 also includes at least one transceiver 702. The transceiver 702 is configured to modulate data or other content for transmission by at least one antenna or NIC (Network Interface Controller) 704. The transceiver 702 is also configured to demodulate data or other content received by the at least one antenna 704. Each transceiver 702 includes any suitable structure for generating signals for wireless transmission and/or processing signals received wirelessly or by wire. Each antenna 704 includes any suitable structure for transmitting and/or receiving wireless signals. One or multiple transceivers 702 could be used in the ED 510, and one or multiple antennas 704 could be used in the ED 510. Although shown as a single functional unit, a transceiver 702 could also be implemented using at least one transmitter and at least one separate receiver.

The ED 510 further includes one or more input/output devices 706 or interfaces. The input/output devices 706 facilitate interaction with a user or other devices (network communications) in the network. Each input/output device 706 includes any suitable structure for providing information to or receiving/providing information from a user, such as a speaker, microphone, keypad, keyboard, display, or touch screen, including network interface communications.

In addition, the ED 510 includes at least one memory 708. The memory 708 stores instructions and data used, generated, or collected by the ED 510. For example, the memory 708 could store software instructions or modules configured to implement some or all of the functionality and/or embodiments described above and that are executed by the processing unit(s) 700. Each memory 708 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 7B, the base station 570 includes at least one processing unit 750, at least one transmitter 752, at least one receiver 754, one or more antennas 756, at least one memory 758, and one or more input/output devices or interfaces 766. A transceiver, not shown, may be used instead of the transmitter 752 and receiver 754. A scheduler 753 may be coupled to the processing unit 750. The scheduler 753 may be included within or operated separately from the base station 570. The processing unit 750 implements various processing operations of the base station 570, such as signal coding, data processing, power control, input/output processing, or any other functionality. The processing unit 750 can also be configured to implement some or all of the functionality and/or embodiments described in more detail above. Each processing unit 750 includes any suitable processing or computing device configured to perform one or more operations. Each processing unit 750 could, for example, include a microprocessor, microcontroller, digital signal processor, field programmable gate array, or application specific integrated circuit.

Each transmitter 752 includes any suitable structure for generating signals for wireless transmission to one or more EDs or other devices. Each receiver 754 includes any suitable structure for processing signals received wirelessly or by wire from one or more EDs or other devices. Although shown as separate components, at least one transmitter 752 and at least one receiver 754 could be combined into a transceiver. Each antenna 756 includes any suitable structure for transmitting and/or receiving wireless signals. While a common antenna 756 is shown here as being coupled to both the transmitter 752 and the receiver 754, one or more antennas 756 could be coupled to the transmitter(s) 752, and one or more separate antennas 756 could be coupled to the receiver(s) 754. Each memory 758 includes any suitable volatile and/or non-volatile storage and retrieval device(s) such as those described above in connection with the ED 510. The memory 758 stores instructions and data used, generated, or collected by the base station 570. For example, the memory 758 could store software instructions or modules configured to implement some or all of the functionality and/or embodiments described above and that are executed by the processing unit(s) 750.

Each input/output device 766 facilitates interaction with a user or other devices (network communications) in the network. Each input/output device 766 includes any suitable structure for providing information to or receiving/providing information from a user, including network interface communications.

Figure 8:
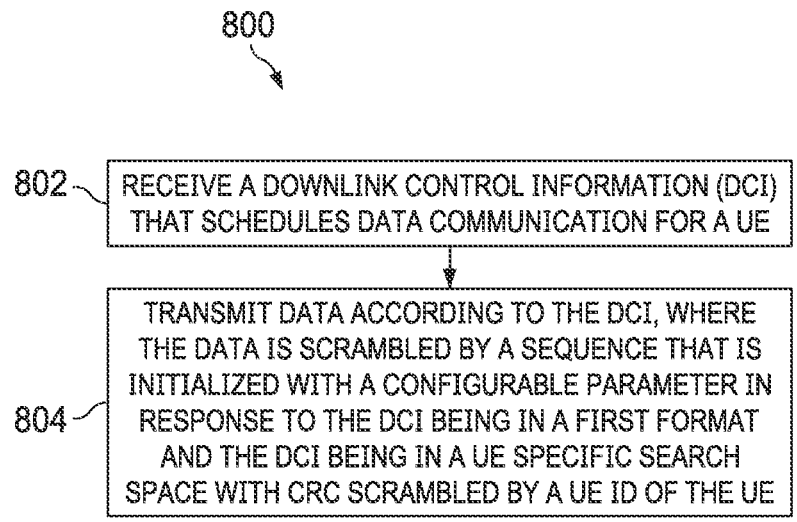
FIG. 8 illustrates a flowchart of an embodiment method for wireless communications.

FIG. 8 illustrates a flowchart of an embodiment method 800 for wireless communications. The method 800 may be indicative of operations performed by a UE. As shown, at step 802, the UE receives downlink control information (DCI) that schedules uplink data communication for a UE. At step 804, the UE transmits data according to the DCI, where the data is scrambled by a sequence that is initialized with a configurable parameter in response to the DCI being in a first format and the DCI being in a UE specific search space with cyclic redundancy check (CRC) scrambled by a UE identifier (ID) of the UE.

Figure 9:
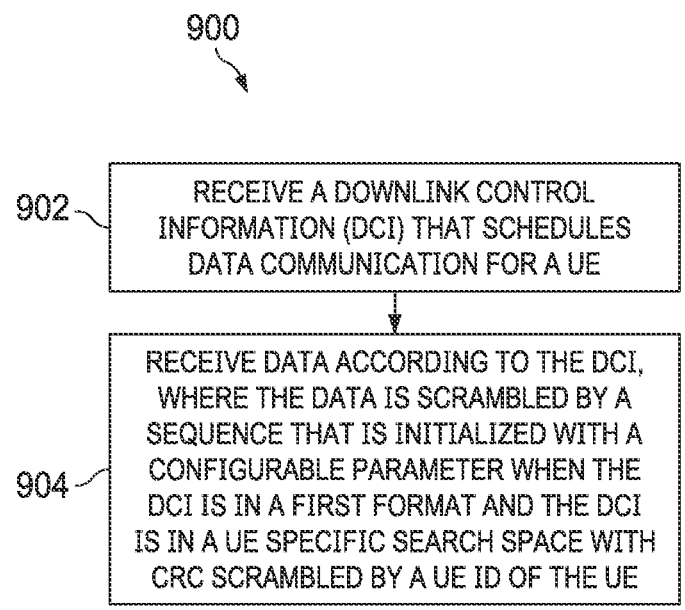
FIG. 9 illustrates a flowchart of another embodiment method for wireless communications.

FIG. 9 illustrates a flowchart of another embodiment method 900 for wireless communications. The method 900 may be indicative of operations performed by a UE. As shown, at step 902, the UE receives downlink control information (DCI) that schedules downlink data communication for a UE. At step 904, the UE receives data according to the DCI, where the data is scrambled by a sequence that is initialized with a configurable parameter when the DCI is in a first format and the DCI is in a UE specific search space with cyclic redundancy check (CRC) scrambled by a UE identifier (ID) of the UE.

Figure 10:
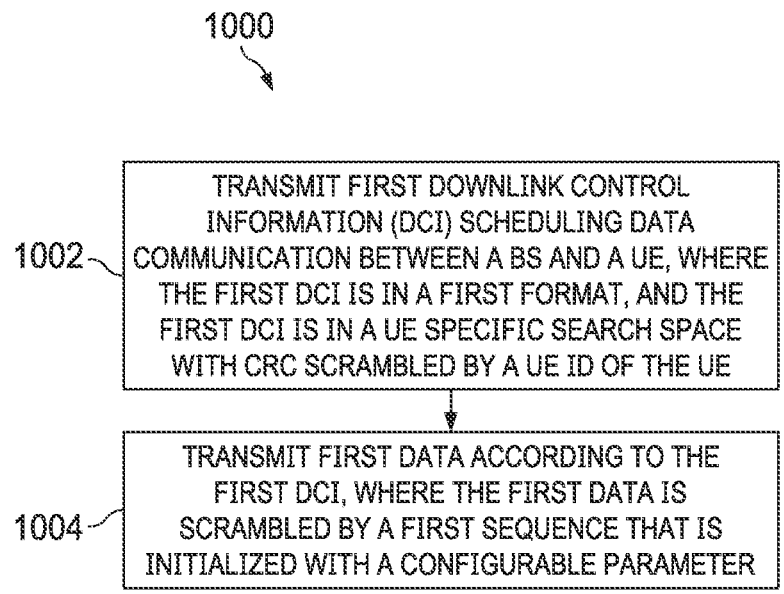
FIG. 10 illustrates a flowchart of yet another embodiment method for wireless communications.

FIG. 10 illustrates a flowchart of yet another embodiment method woo for wireless communications. The method woo may be indicative of operations performed by a base station (BS). As shown, at step 1002, the BS transmits first downlink control information (DCI) scheduling downlink data communication between a BS and a UE, where the first DCI is in a first format, and the first DCI is in a UE specific search space with cyclic redundancy check (CRC) scrambled by a UE identifier (ID) of the UE. At step 1004, the BS transmits first data according to the first DCI, where the first data is scrambled by a first sequence that is initialized with a configurable parameter.

Figure 11:
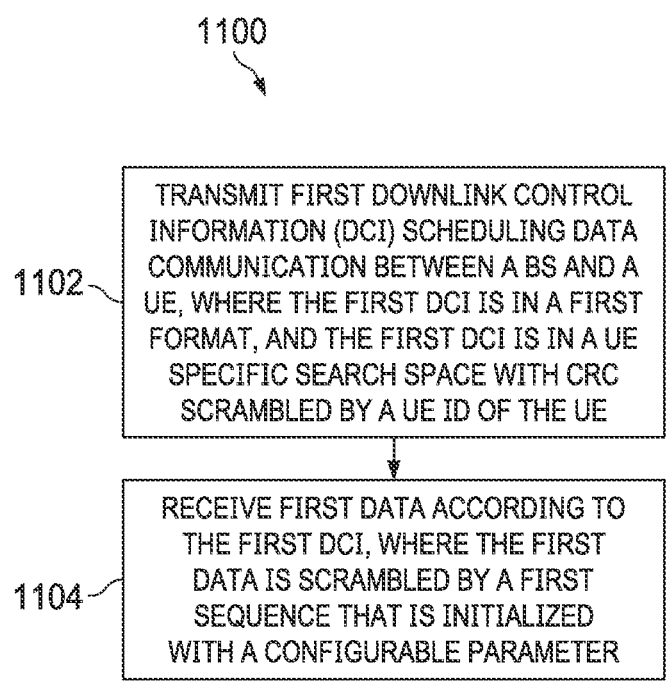
FIG. 11 illustrates a flowchart of yet another embodiment method for wireless communications.

FIG. 11 illustrates a flowchart of yet another embodiment method 1100 for wireless communications. The method 1100 may be indicative of operations performed by a BS. As shown, at step 1102, the BS transmits first downlink control information (DCI) scheduling uplink data communication between a BS and a UE, where the first DCI is in a first format, and the first DCI is in a UE specific search space with cyclic redundancy check (CRC) scrambled by a UE identifier (ID) of the UE. At step 1104, the BS receives first data according to the first DCI, where the first data is scrambled by a first sequence that is initialized with a configurable parameter.

Embodiments of the present disclosure provide a method for data and/or reference signals transmission when a UE detects a format of control information for fallback. With the method provided, the UE may distinguish whether or not the DCI for fallback is sent in a UE specific search space with cyclic redundancy code (CRC) scrambled by a C-RNTI or a CS-RNTI, which may be performed by the UE after a RRC configuration procedure. The UE may determine a DMRS scrambling ID, based on which a DMRS sequence is generated and an initialized sequence for scrambling data is generated. Such that, the UE and a base station can have the consistence of DMRS scrambling ID in different communication scenarios.

According one aspect of the present disclosure, a method is provided, that includes: detecting a first format of downlink control information (DCI) in UE specific search space with CRC scrambled by a UE ID; performing one or more of the following when the first format of DCI is detected:

transmitting a reference signal for data according to the detected first format of DCI, wherein a sequence of the reference signal is associated with an initialized sequence based on a configurable parameter, received from a base station, corresponding to a scrambling ID;

receiving a reference signal for data according to the detected first format of DCI, wherein a sequence of the reference signal is associated with an initialized sequence based on a configurable parameter, received from a base station, corresponding to a scrambling ID ($n_{SCID}$);

transmitting data according to the detected first format of DCI, wherein the data is scrambled by a sequence which is initialized with a configurable parameter, received from a base station; and receiving data according to the detected first format of DCI, wherein the data is scrambled by a sequence which is initialized with a configurable parameter, received from a base station.

Optionally, in any of the preceding aspects, the method further includes performing one or more of the following when the first format of DCI is not detected in UE specific search space with CRC scrambled by the UE ID:

transmitting a reference signal for data according to the detected first format of DCI, wherein a sequence of the reference signal is associated with an initialized sequence based on a cell ID;

receiving a reference signal for data according to the detected first format of DCI, wherein a sequence of the reference signal is associated with an initialized sequence based on a cell ID;

transmitting data according to the detected first format of DCI, wherein the data is scrambled by a sequence which is initialized with a cell ID; and receiving data according to the detected first format of DCI, wherein the data is scrambled by a sequence which is initialized with a cell ID.

Optionally, in any of the preceding aspects, the scrambling ID ($n_{SCID}$) is a demodulation reference signal scrambling ID.

Optionally, in any of the preceding aspects, a value of the $n_{SCID}$ is 0.

Optionally, in any of the preceding aspects, the reference signal is a demodulation reference signal.

Optionally, in any of the preceding aspects, the first format of DCI is a format of DCI for fallback.

Optionally, in any of the preceding aspects, the UE ID may be a C-RNTI (cell-radio network temporary identifier) or CS-RNTI (configured scheduling-RNTI).

Optionally, in any of the preceding aspects, the initialized sequence, associated to the sequence of the UE transmitted reference signal for data (DMRS for PUSCH) based on a configurable parameter corresponding to a scrambling ID, is a function of the configurable parameter, $f(N_{ID}^{nSCID})$, where $N_{ID}^{nSCID} \in \{0,1, \ldots, 65535\}$ is given by a higher-layer parameter where $n_{SCID}=0$.

Optionally, in any of the preceding aspects, the formula with the function is as following:

$$c_{init}=(2^{17}(N_{symb}^{slot}n_{s,f}^{\mu}+l+1)(2N_{ID}^{nSCID}+1)+2N_{ID}^{nSCID}+n_{SCID}) \mod 2^{31}$$

where $c_{init}$ is the initialized sequence, l is the OFDM symbol number within the slot, $n_{s,f}^{\mu}$ is the slot number within a frame, and $N_{ID}^{nSCID} \in \{0,1, \ldots, 65535\}$ is given by a higher-layer parameter UL-DMRS-Scrambling-ID where $n_{SCID}=0$.

Optionally, in any of the preceding aspects, the initialized sequence, associated with the UE received reference signal for data (DMRS for PDSCH) according to the detected first format of DCI based on a configurable parameter corresponding to a scrambling ID, is a function of the configurable parameter, $f(N_{ID}^{nSCID})$, where $N_{ID}^{nSCID} \in \{0,1, \ldots, 65535\}$ is given by a higher-layer parameter where $n_{SCID}=0$.

Optionally, in any of the preceding aspects, the formula with the function is as following:

$$c_{init}=(2^{17}(14n_{s,f}^{\mu}+l+1)(2N_{ID}^{nSCID}+1)+2N_{ID}^{nSCID}) \mod 2^{31},$$

where $c_{init}$ is the initialized sequence, l is the OFDM symbol number within the slot, $n_{s,f}^{\mu}$ is the slot number within a frame, and $N_{ID}^{nSCID} \in \{0,1, \ldots, 65535\}$ is given by a higher-layer parameter DL-DMRS-Scrambling-ID where $n_{SCID}=0$.

Optionally, in any of the preceding aspects, the initialized sequence for the scrambling sequence of the uplink data (PUSCH), is a function of a configurable parameter, $n_{ID}$, where $n_{ID} \in \{0,1, \ldots, 1023\}$ equals a higher-layer parameter.

Optionally, in any of the preceding aspects, the formula with the function is as following:

$$c_{init}=n_{RNTI} \cdot 2^{15}+n_{ID},$$

where $c_{init}$ is the initialized sequence, $n_{ID} \in \{0,1, \ldots, 1023\}$ equals the higher-layer parameter Data-scrambling-Identity and $n_{RNTI}$ corresponds to the RNTI associated with the PUSCH transmission.

Optionally, in any of the preceding aspects, the initialized sequence for the scrambling sequence of the downlink data (PDSCH), is a function of a configurable parameter ($n_{ID}$), where $n_{ID}\{0,1, \ldots, 1023\}$ equals a higher-layer parameter Optionally, in any of the preceding aspects, the formula with the function is as following:

$$c_{init}=n_{RNTI} \cdot 2^{15}+q \cdot 2^{14}+n_{ID},$$

where $c_{init}$ is the initialized sequence, $n_{ID} \in \{0,1, \ldots, 1023\}$ equals the higher-layer parameter Data-scrambling-Identity and $n_{RNTI}$ corresponds to the RNTI associated with the PUSCH transmission.

Optionally, in any of the preceding aspects, the detecting is performed after a radio resource control (RRC) configuration procedure.

According to one aspect of the present disclosure, there is provided an apparatus that includes a processor, coupled with a storage including instructions, when the instructions are executed, causing the processor to perform the steps of: detecting a first format of downlink control information (DCI) in UE specific search space with CRC scrambled by a UE ID; performing one or more of the following when the first format of DCI is detected:

transmitting a reference signal for data according to the detected first format of DCI, wherein a sequence of the reference signal is associated with an initialized sequence based on a configurable parameter, received from a base station, corresponding to a scrambling ID;

receiving a reference signal for data according to the detected first format of DCI, wherein a sequence of the reference signal is associated with an initialized sequence based on a configurable parameter, received from a base station, corresponding to a scrambling ID ($n_{SCID}$);

transmitting data according to the detected first format of DCI, wherein the data is scrambled by a sequence which is initialized with a configurable parameter, received from a base station; and receiving data according to the detected first format of DCI, wherein the data is scrambled by a sequence which is initialized with a configurable parameter, received from a base station.

According one aspect of the present disclosure, a method is provided, that includes: receiving, by a user equipment (UE), downlink control information (DCI) that schedules data communication for the UE; and transmitting, by the UE, data according to the DCI, the data being scrambled by a sequence, and the sequence being initialized with a configurable parameter in response to the DCI being in a first format and the DCI being in a UE specific search space with cyclic redundancy check (CRC) scrambled by a UE identifier (ID) of the UE. That is, the sequence is initialized with the configurable parameter when (or upon determining that) the DCI is in a first format and the DCI is in the UE specific search space with CRC scrambled by the ID of the UE.

Optionally, in any of the preceding aspects, the method further includes receiving, by the UE, the configurable parameter from a base station (BS).

Optionally, in any of the preceding aspects, the sequence is initialized with a cell ID in response to the DCI being in a common search space with CRC scrambled by the UE ID of the UE.

Optionally, in any of the preceding aspects, the first format of the DCI is a format of DCI for fallback.

Optionally, in any of the preceding aspects, the UE ID comprises a cell-radio network temporary identifier (C-RNTI), a modulation and coding scheme-C-RNTI (MCS-C-RNTI) or a configured scheduling-RNTI (CS-RNTI).

Optionally, in any of the preceding aspects, the sequence is initialized using an initialized sequence that is determined based on the configurable parameter represented by $n_{ID}$.

Optionally, in any of the preceding aspects, $n_{ID} \in \{0,1,\ldots,1023\}$ is configured by higher-layer signaling. Optionally, $n_{ID} \in \{0,1,\ldots,1023\}$ may be indicated by a higher-layer parameter, or equal s a higher-layer parameter.

Optionally, in any of the preceding aspects, the initialized sequence is determined based on the configurable parameter represented by $n_{ID}$, wherein the initialized sequence satisfies $c_{init}=n_{RNTI} \cdot 2^{15}+n_{ID}$, $c_{init}$ represents the initialized sequence, and $n_{RNTI}$ corresponds to a radio network temporary identifier (RNTI) associated with a physical uplink shared channel (PUSCH) transmission.

Optionally, in any of the preceding aspects, receiving the DCI comprises detecting the DCI after a radio resource control (RRC) configuration procedure is performed.

Optionally, in any of the preceding aspects, the first format comprises a DCI format 0_0 for a PUSCH.

According one aspect of the present disclosure, a method is provided, that includes: receiving, by a user equipment (UE), downlink control information (DCI) that schedules data communication for the UE; and receiving, by the UE, data according to the DCI, the data being scrambled by a sequence, and the sequence being initialized with a configurable parameter when the DCI is in a first format and the DCI is in a UE specific search space with cyclic redundancy check (CRC) scrambled by a UE identifier (ID) of the UE. That is, the sequence is initialized with the configurable parameter in response to (or upon determining or when) that the DCI is in a first format and the DCI is in the UE specific search space with CRC scrambled by the ID of the UE.

Optionally, in any of the preceding aspects, the method further includes receiving, by the UE, the configurable parameter from a base station (BS).

Optionally, in any of the preceding aspects, the sequence is initialized with a cell ID when the DCI is in a common search space with CRC scrambled by the UE ID of the UE.

Optionally, in any of the preceding aspects, receiving the data according to the DCI includes descrambling, by the UE, the data using the sequence that is initialized with the configurable parameter.

Optionally, in any of the preceding aspects, the first format of the DCI is a format of DCI for fallback.

Optionally, in any of the preceding aspects, the UE ID comprises a cell-radio network temporary identifier (C-RNTI), a modulation and coding scheme-C-RNTI (MCS-C-RNTI) or a configured scheduling-RNTI (CS-RNTI).

Optionally, in any of the preceding aspects, the sequence is initialized using an initialized sequence that is determined based on the configurable parameter represented by $n_{ID}$.

Optionally, in any of the preceding aspects, $n_{ID} \in \{0,1,\ldots,1023\}$ is configured by higher-layer signaling. Optionally, $n_{ID} \in \{0,1,\ldots,1023\}$ may be indicated by a higher-layer parameter, or equal s a higher-layer parameter.

Optionally, in any of the preceding aspects, the initialized sequence is determined based on the configurable parameter represented by $n_{ID}$, wherein the initialized sequence satisfies $c_{init}=n_{RNTI} \cdot 2^{15}+q \cdot 2^{14}+n_{ID}$, $c_{init}$ is the initialized sequence, and $n_{RNTI}$ corresponds to a RNTI associated with a physical downlink shared channel (PDSCH) transmission.

Optionally, in any of the preceding aspects, receiving the DCI comprises detecting the DCI after a radio resource control (RRC) configuration procedure is performed.

Optionally, in any of the preceding aspects, the first format comprises a DCI format 1_0 for a PDSCH.

According another aspect of the present disclosure, a method is provided, that includes: transmitting, by a base station (BS), first downlink control information (DCI) that schedules data communication between the BS and a user equipment (UE), the first DCI being in a first format, and the first DCI being in a UE specific search space with cyclic redundancy check (CRC) scrambled by a UE identifier (ID) of the UE; and transmitting, by the BS, first data according to the first DCI, the first data being scrambled by a first sequence that is initialized with a configurable parameter.

Optionally, in any of the preceding aspects, the method further includes: transmitting, by the BS, second DCI scheduling data communication between the BS and the UE, the second DCI being in a common search space with CRC scrambled by the UE ID of the UE; and transmitting, by the BS, second data according to the second DCI, the second data being scrambled by a second sequence that is initialized with a cell identifier (ID).

Optionally, in any of the preceding aspects, the first format of the first DCI is a format of DCI for fallback.

Optionally, in any of the preceding aspects, the UE ID comprises a cell-radio network temporary identifier (C-RNTI), a modulation and coding scheme-C-RNTI (MCS-C-RNTI) or a configured scheduling-RNTI (CS-RNTI).

Optionally, in any of the preceding aspects, the first sequence is initialized using an initialized sequence that is determined based on the configurable parameter represented by $n_{ID}$.

Optionally, in any of the preceding aspects, $n_{ID} \in \{0,1, \ldots, 1023\}$ is configured by higher-layer signaling. Optionally, $n_{ID} \in \{0,1, \ldots, 1023\}$ may be indicated by a higher-layer parameter, or equal s a higher-layer parameter.

Optionally, in any of the preceding aspects, the initialized sequence is determined based on the configurable parameter represented by $n_{ID}$, wherein the initialized sequence satisfies $c_{init} = n_{RNTI} \cdot 2^{15} + q \cdot 2^{14} + n_{ID}$, $c_{init}$ is the initialized sequence, and $n_{RNTI}$ corresponds to a RNTI associated with a physical downlink shared channel (PDSCH) transmission.

According another aspect of the present disclosure, a method is provided, that includes: transmitting, by a base station (BS), first downlink control information (DCI) scheduling data communication between the BS and a user equipment (UE), the first DCI being in a first format, and the first DCI being in a UE specific search space with cyclic redundancy check (CRC) scrambled by a UE identifier (ID) of the UE; and receiving, by the BS, first data according to the first DCI, the first data being scrambled by a first sequence that is initialized with a configurable parameter.

Optionally, in any of the preceding aspects, receiving the first data according to the first DCI includes descrambling, by the BS, the first data using the first sequence that is initialized with the configurable parameter.

Optionally, in any of the preceding aspects, the method further includes: transmitting, by the BS, second DCI scheduling data communication between the BS and the UE, the second DCI being in a common search space with CRC scrambled by the UE ID of the UE; and receiving, by the BS, second data according to the second DCI, the second data being scrambled by a second sequence that is initialized with a cell identifier (ID).

Optionally, in any of the preceding aspects, the first format of the first DCI is a format of DCI for fallback.

Optionally, in any of the preceding aspects, the UE ID comprises a cell-radio network temporary identifier (C-RNTI) or a configured scheduling-RNTI (CS-RNTI).

Optionally, in any of the preceding aspects, the first sequence is initialized using an initialized sequence that is determined based on the configurable parameter represented by $n_{ID}$.

Optionally, in any of the preceding aspects, $n_{ID} \in \{0,1, \ldots, 1023\}$ is configured by higher-layer signaling. Optionally, $n_{ID} \in \{0,1, \ldots, 1023\}$ may be indicated by a higher-layer parameter, or equal s a higher-layer parameter.

Optionally, in any of the preceding aspects, the initialized sequence is determined based on the configurable parameter represented by $n_{ID}$, wherein the initialized sequence satisfies $c_{init} = n_{RNTI} \cdot 2^{15} + n_{ID}$, $c_{init}$ is the initialized sequence, and $n_{RNTI}$ corresponds to a radio network temporary identifier (RNTI) associated with a physical uplink shared channel (PUSCH) transmission.

According another aspect of the present disclosure, an apparatus is provided, that includes one or more processors, configured to be coupled with at least one non-transitory memory storage, wherein the non-transitory memory storage is configured to store instructions, which when executed, cause the one or more processors to: receive downlink control information (DCI) that schedules data communication for the apparatus; and transmit data according to the DCI, the data being scrambled by a sequence, and the sequence being initialized with a configurable parameter in response to the DCI being in a first format and the DCI being in a UE specific search space with cyclic redundancy check (CRC) scrambled by a UE identifier (ID) of the apparatus or a UE which the apparatus is used for. That is, the sequence is initialized with the configurable parameter when (or upon determining that) the DCI is in a first format and the DCI is in the UE specific search space with CRC scrambled by the ID of the UE.

Optionally, in any of the preceding aspects, the one or more processors execute the instructions to further: receive the configurable parameter from a base station (BS).

Optionally, in any of the preceding aspects, the sequence is initialized with a cell ID in response to the DCI being in a common search space with CRC scrambled by the UE ID of the apparatus or the UE which the apparatus is used for.

Optionally, in any of the preceding aspects, the first format of the DCI is a format of DCI for fallback.

Optionally, in any of the preceding aspects, the UE ID comprises a cell-radio network temporary identifier (C-RNTI), a modulation and coding scheme-C-RNTI (MCS-C-RNTI) or a configured scheduling-RNTI (CS-RNTI).

Optionally, in any of the preceding aspects, the sequence is initialized using an initialized sequence that is determined based on the configurable parameter represented by $n_{ID}$.

Optionally, in any of the preceding aspects, $n_{ID} \in \{0,1, \ldots, 1023\}$ is configured by higher-layer signaling. Optionally, $n_{ID} \in \{0,1, \ldots, 1023\}$ may be indicated by a higher-layer parameter, or equal s a higher-layer parameter.

Optionally, in any of the preceding aspects, the initialized sequence is determined based on the configurable parameter represented by $n_{ID}$, wherein the initialized sequence satisfies $c_{init} = n_{RNTI} \cdot 2^{15} + n_{ID}$, $c_{init}$ is the initialized sequence, and $n_{RNTI}$ corresponds to a radio network temporary identifier (RNTI) associated with a physical uplink shared channel (PUSCH) transmission.

Optionally, in any of the preceding aspects, receiving the DCI comprises detecting the DCI after a radio resource control (RRC) configuration procedure is performed.

Optionally, in any of the preceding aspects, the first format comprises a DCI format 0_0 for a PUSCH.

According another aspect of the present disclosure, an apparatus is provided, that includes one or more processors, configured to couple with a non-transitory memory storage, wherein the non-transitory memory storage is configured to store instructions, which when executed, cause the one or more processors to: receive downlink control information (DCI) that schedules data communication for the apparatus; and receive data according to the DCI, the data being scrambled by a sequence, and the sequence being initialized with a configurable parameter when the DCI is in a first format and the DCI is in a UE specific search space with cyclic redundancy check (CRC) scrambled by a UE identifier (ID) of the apparatus or a UE which the apparatus is used for. That is, the sequence is initialized with the configurable parameter in response to (or upon determining that or when) the DCI is in a first format and the DCI is in the UE specific search space with CRC scrambled by the ID of the UE.

Optionally, in any of the preceding aspects, the one or more processors execute the instructions to further receive the configurable parameter from a base station (BS).

Optionally, in any of the preceding aspects, the sequence is initialized with a cell ID when the DCI is in a common search space with CRC scrambled by the UE ID of the apparatus or the UE which the apparatus is used for.

Optionally, in any of the preceding aspects, receiving the data according to the DCI comprises descrambling the data using the sequence that is initialized with the configurable parameter.

Optionally, in any of the preceding aspects, the first format of the DCI is a format of DCI for fallback.

Optionally, in any of the preceding aspects, the UE ID comprises a cell-radio network temporary identifier (C-RNTI) or a configured scheduling-RNTI (CS-RNTI).

Optionally, in any of the preceding aspects, the sequence is initialized using an initialized sequence that is determined based on the configurable parameter represented by $n_{ID}$.

Optionally, in any of the preceding aspects, $n_{ID} \in \{0,1, \ldots, 1023\}$ is configured by higher-layer signaling. Optionally, $n_{ID} \in \{0,1, \ldots, 0123\}$ may be indicated by a higher-layer parameter, or equal a higher-layer parameter.

Optionally, in any of the preceding aspects, the initialized sequence is determined based on the configurable parameter represented by $n_{ID}$, wherein the initialized sequence satisfies $c_{init} = n_{RNTI} \cdot 2^{15} + q \cdot 2^{14} + n_{ID}$, $c_{init}$ represents the initialized sequence, and $n_{RNTI}$ corresponds to a RNTI associated with a physical downlink shared channel (PDSCH) transmission.

Optionally, in any of the preceding aspects, receiving the DCI comprises detecting the DCI after a radio resource control (RRC) configuration procedure is performed.

Optionally, in any of the preceding aspects, the first format comprises a DCI format 1_0 for a PDSCH.

According another aspect of the present disclosure, an apparatus is provided, that includes one or more processors, configured to couple with a non-transitory memory storage, wherein the non-transitory memory storage is configured to store instructions, which when executed, cause the one or more processors to: transmit first downlink control information (DCI) scheduling data communication between the apparatus or a base station (BS) which the apparatus is used for and a user equipment (UE), the first DCI being in a first format, and the first DCI being in a UE specific search space with cyclic redundancy check (CRC) scrambled by a UE identifier (ID) of the UE; and transmit first data according to the first DCI, the first data being scrambled by a first sequence that is initialized with a configurable parameter.

Optionally, in any of the preceding aspects, the one or more processors execute the instructions to further: transmit second DCI scheduling data communication between the apparatus or the base station (BS) which the apparatus is used for and the UE, wherein the second DCI being in a common search space with CRC scrambled by the UE ID of the UE; and transmit second data according to the second DCI, the second data being scrambled by a second sequence that is initialized with a cell identifier (ID).

Optionally, in any of the preceding aspects, the first format of the first DCI is a format of DCI for fallback.

Optionally, in any of the preceding aspects, the UE ID comprises a cell-radio network temporary identifier (C-RNTI) or a configured scheduling-RNTI (CS-RNTI).

Optionally, in any of the preceding aspects, the first sequence is initialized using an initialized sequence that is determined based on the configurable parameter represented by $n_{ID}$.

Optionally, in any of the preceding aspects, $n_{ID} \in \{0,1, \ldots, 1023\}$ is configured by higher-layer signaling. Optionally, $n_{ID} \in \{0,1, \ldots, 1023\}$ may be indicated by a higher-layer parameter, or equal a higher-layer parameter.

Optionally, in any of the preceding aspects, the initialized sequence is determined based on the configurable parameter represented by $n_{ID}$, wherein the initialized sequence satisfies $c_{init} = n_{RNTI} \cdot 2^{15} + q \cdot 2^{14} + n_{ID}$, $c_{init}$ represents the initialized sequence, and $n_{RNTI}$ corresponds to a RNTI associated with a physical downlink shared channel (PDSCH) transmission.

According another aspect of the present disclosure, an apparatus is provided, that includes one or more processors, configured to couple with a non-transitory memory storage, wherein the non-transitory memory storage is configured to store instructions, which when executed, cause the one or more processors to: transmit first downlink control information (DCI) scheduling data communication between the apparatus or a base station (BS) which the apparatus is used for and a user equipment (UE), the first DCI being in a first format, and the first DCI being in a UE specific search space with cyclic redundancy check (CRC) scrambled by a UE identifier (ID) of the UE; and receive first data according to the first DCI, the first data being scrambled by a first sequence that is initialized with a configurable parameter.

Optionally, in any of the preceding aspects, receiving the first data according to the first DCI comprises: descrambling the first data using the first sequence that is initialized with the configurable parameter.

Optionally, in any of the preceding aspects, the one or more processors execute the instructions to further: transmit second DCI scheduling data communication between the apparatus or the base station (BS) which the apparatus is used for and the UE, the second DCI being in a common search space with CRC scrambled by the UE ID of the UE; and receive second data according to the second DCI, the second data being scrambled by a second sequence that is initialized with a cell identifier (ID).

Optionally, in any of the preceding aspects, the first format of the first DCI is a format of DCI for fallback.

Optionally, in any of the preceding aspects, the UE ID comprises a cell-radio network temporary identifier (C-RNTI) or a configured scheduling-RNTI (CS-RNTI).

Optionally, in any of the preceding aspects, the first sequence is initialized using an initialized sequence that is determined based on the configurable parameter represented by $n_{ID}$.

Optionally, in any of the preceding aspects, $n_{ID} \in \{0,1, \ldots, 1023\}$ is configured by higher-layer signaling. Optionally, $n_{ID} \in \{0,1, \ldots, 1023\}$ may be indicated by a higher-layer parameter, or equal a higher-layer parameter.

Optionally, in any of the preceding aspects, the initialized sequence is determined based on the configurable parameter represented by $n_{ID}$, wherein the initialized sequence satisfies $c_{init} = n_{RNTI} \cdot 2^{15} + n_{ID}$, $c_{init}$ is the initialized sequence, and $n_{RNTI}$ corresponds to a radio network temporary identifier (RNTI) associated with a physical uplink shared channel (PUSCH) transmission.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a performing unit/module, a detecting unit/module, an initializing unit/module, a scrambling unit/module, a descrambling unit/module, and/or a decoding unit/module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

In the present application, "at least one" means one or more, and "a plurality" means two or more. "and/or", describing the association relationship of the associated object, indicating that there may be three relationships, for example, A and/or B, which may indicate that A exists separately, A and B exist at the same time, and B exists separately, where A, B can be singular or plural. The character "/" generally indicates that the contextual object is an "or" relationship. "At least one of the following" or a similar expression thereof refers to any combination of these items, including any combination of a single item or a plurality of items. For example, at least one of a, b, or c may represent: a, b, c, ab, ac, bc, or abc, where a, b, c may be single or multiple.

The following references are related to the subject matter of the present application. Each of these references is incorporated herein by reference in its entirety:

3rd Generation Partnership Project (3GPP) Technical Specification (TS) 38.213, V15.1.0 (2018-03), entitled "3rd Generation Partnership Project; Technical Specification Group Radio Access Network; NR; Physical layer procedures for control (Release 15)".

3GPP TS 38.212, V15.1.1 (2018-03), entitled "3rd Generation Partnership Project; Technical Specification Group Radio Access Network; NR; Multiplexing and channel coding (Release 15)".

3GPP TS 38.211, V15.1.0 (2018-03), entitled "3rd Generation Partnership Project. Technical Specification Group Radio Access Network; NR; Physical channels and modulation (Release 15)".

3GPP TS 38.211, V15.3.0 (2018-09), entitled "3rd Generation Partnership Project. Technical Specification Group Radio Access Network; NR; Physical channels and modulation (Release 15)".

3GPP TS 38.300, V15.1.0 (2018-03), entitled "3rd Generation Partnership Project; Technical Specification Group Radio Access Network; NR; NR and NG-RAN Overall Description; Stage 2 (Release 15)".

3GPP TS 38.331, V15.1.0 (2018-03), entitled "3rd Generation Partnership Project; Technical Specification Group Radio Access Network; NR; Radio Resource Control (RRC) protocol specification (Release 15)".

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one embodiment may be combined with selected features of other embodiments.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

The invention claimed is:

1. A method, comprising:
sending, by a base station (BS), first downlink control information (DCI) with a format 1_0 and in a user equipment (UE) specific search space with cyclic redundancy check (CRC) scrambled by a UE identifier (UE ID) of a UE, the first DCI scheduling communication of a first physical downlink shared channel (PDSCH) for the UE; and in response to the first DCI with the format 1_0 and in the UE specific search space, scrambling, by the BS, first data to be transmitted on the first PDSCH using a first sequence that is generated by the BS based on a configurable parameter that is sent to the UE, with the first sequence initialized by the BS with the configurable parameter, and sending, by the BS, the scrambled first data on the first PDSCH, wherein initializing the first sequence with the configurable parameter comprises obtaining, by the BS, the first sequence using an initialized sequence that is determined, by the BS, based on the configurable parameter represented by $n_{ID}$ wherein $n_{ID} \in \{0,1,\ldots,1023\}$ is to be configured by higher-layer signaling to the UE, wherein the initialized sequence is determined based on the configurable parameter represented by $N_{ID}$, and wherein the initialized sequence satisfies $c_{init} = n_{RNTI} \cdot 2^{15} + q \cdot 2^{14} + n_{ID}$, $c_{init}$ is the initialized sequence, and $n_{RNTI}$ corresponds to a network temporary identifier (RNTI) associated with a PDSCH transmission.

2. The method of claim 1, further comprising:
sending, by the BS, second DCI in a common search space with CRC scrambled by the UE ID of the UE, the second DCI scheduling communication of a second PDSCH for the UE; and in response to the second DCI being in the common search space, scrambling, by the BS, second data to be transmitted on the second PDSCH using a second sequence that is generated by the BS based on a cell ID, with the second sequence initialized with the cell ID, and transmitting, by the BS, the scrambled second data on the second PDSCH.

3. The method of claim 2, wherein the second DCI uses the format 1_0.

4. The method of claim 1, wherein initializing the first sequence with the configurable parameter comprises:
generating, by the BS, the initialized sequence of the first sequence based on the configurable parameter.

5. The method of claim 1, wherein the UE ID comprises a cell-radio network temporary identifier (C-RNTI), a modulation and coding scheme-C-RNTI (MCS-C-RNTI) or a configured scheduling-RNTI (CS-RNTI).

6. The method of claim 1, wherein sending the first DCI comprises sending the first DCI after a radio resource control (RRC) configuration procedure is performed.

7. The method of claim 1, further comprising:
sending, by the BS, the first PDSCH scheduled by the first DCI.

8. A method, comprising:
sending, by a base station (BS), first downlink control information (DCI) with a format 0_0 and in a user equipment (UE) specific search space with cyclic redundancy check (CRC) scrambled by a UE identifier (UE ID) of a UE, the first DCI scheduling communication of a first physical uplink shared channel (PUSCH) for the UE; and in response to the first DCI with the format 0_0 and in the UE specific search space, receiving, by the BS, the first PUSCH scrambled by a first sequence which is initialized with a configurable parameter sent to the UE, wherein the first sequence is based on an initialized sequence that is determined based on the configurable parameter represented by $n_{ID}$, wherein $n_{ID} \in \{0,1, \ldots, 1023\}$ is to be configured by higher-layer signaling to the UE and wherein the initialized sequence satisfies $c_{init} = n_{RNTI} \cdot 2^{15} + n_{ID}$ wherein cant is the initialized sequence, and $n_{RNTI}$ corresponds to a network temporary identifier (RNTI) associated with a PUSCH transmission.

9. The method according to claim 8, further comprising:
sending, by the BS, second DCI in a common search space with CRC scrambled by the UE ID of the UE, the second DCI scheduling communication of a second PUSCH for the UE; and
in response to the second DCI being in the common search space, generating, by the BS, a second sequence by initializing, by the BS, the second sequence with a cell ID, and descrambling, by the BS, the second PUSCH using the second sequence.

10. The method of claim 9, wherein the second DCI uses the format 0_0.

11. The method of claim 8, further comprising:
sending, by the BS, the configurable parameter to the UE.

12. The method of claim 8, wherein the UE ID comprises a cell-radio network temporary identifier (C-RNTI), a modulation and coding scheme-C-RNTI (MCS-C-RNTI) or a configured scheduling-RNTI (CS-RNTI).

13. The method according to claim 8, further comprising:
generating, by the BS, the first sequence by initializing the first sequence with the configurable parameter sent to the UE, and
descrambling, by the BS, the first PUSCH using the first sequence.

14. The method of claim 13, wherein initializing the first sequence with the configurable parameter comprises:
generating, by the BS, the initialized sequence of the first sequence based on the configurable parameter.

15. The method of claim 13, wherein initializing the first sequence with the configurable parameter comprises:
obtaining, by the BS, the first sequence using the initialized sequence.

16. The method of claim 8, wherein sending the first DCI comprises sending the first DCI after a radio resource control (RRC) configuration procedure is performed.

17. The method of claim 8, further comprising:
receiving, by the BS, the first PUSCH scheduled by the first DCI.

18. An apparatus, comprising:
one or more processors, configured to couple with a memory storage, wherein the memory storage is configured to store instructions, which when executed, cause the apparatus to perform:
sending first downlink control information (DCI) with a format 1_0 and in a user equipment (UE) specific search space with cyclic redundancy check (CRC) scrambled by a UE identifier (UE ID) of a UE, the first DCI scheduling communication of a first physical downlink shared channel (PDSCH) for the UE; and
in response to the first DCI with the format 1_0 and in the UE specific search space, scrambling first data to be transmitted on the first PDSCH using a first sequence that is generated based on a configurable parameter that is sent to the UE, with the first sequence initialized with the configurable parameter, and sending the scrambled first data on the first PDSCH,
wherein initializing the first sequence with the configurable parameter comprises obtaining the first sequence using an initialized sequence that is determined based on the configurable parameter represented by $n_{ID}$, wherein $n_{ID} \in \{0,1, \ldots, 1023\}$ is to be configured by higher-layer signaling to the UE, wherein the initialized sequence is determined based on the configurable parameter represented by $n_{ID}$, and wherein the initialized sequence satisfies $c_{init} = n_{RNTI} \cdot 2^{15} + q \cdot 2^{14} + n_{ID}$, $c_{init}$ is the initialized sequence, and $n_{RNTI}$ corresponds to a network temporary identifier (RNTI) associated with a PDSCH transmission.

19. The apparatus of claim 18, wherein the instructions, when executed, cause the apparatus further to perform:
sending second DCI in a common search space with CRC scrambled by the UE ID of the UE, the second DCI scheduling communication of a second PDSCH for the UE; and
in response to the second DCI being in the common search space, scrambling second data to be transmitted on the second PDSCH using a second sequence that is generated based on a cell ID, with the second sequence initialized with the cell ID, and transmitting the scrambled second data on the second PDSCH.

20. The apparatus of claim 19, wherein the second DCI uses the format 1_0.

21. The apparatus of claim 18, wherein initializing the first sequence with the configurable parameter comprises:
generating the initialized sequence of the first sequence based on the configurable parameter.

22. The apparatus of claim 18, wherein the UE ID comprises a cell-radio network temporary identifier (C-RNTI), a modulation and coding scheme-C-RNTI (MCS-C-RNTI) or a configured scheduling-RNTI (CS-RNTI).

23. The apparatus of claim 18, wherein sending the first DCI comprises sending the first DCI after a radio resource control (RRC) configuration procedure is performed.

24. The apparatus of claim 18, wherein the instructions, when executed, cause the apparatus further to perform:
sending the first PDSCH scheduled by the first DCI.

25. An apparatus, comprising:
one or more processors, configured to couple with a memory storage, wherein the memory storage is configured to store instructions, which when executed, cause the apparatus to perform:
sending first downlink control information (DCI) with a format 0_0 and in a user equipment (UE) specific search space with cyclic redundancy check (CRC) scrambled by a UE identifier (UE ID) of a UE, the first DCI scheduling communication of a first physical uplink shared channel (PUSCH) for the UE; and
in response to the first DCI with the format 0_0 and in the UE specific search space, receiving the first PUSCH scrambled by a first sequence which is initialized with a configurable parameter sent to the UE,
wherein the first sequence is based on an initialized sequence that is determined based on the configurable parameter represented by $n_{ID}$, wherein $n_{ID} \in \{0,1, \ldots, 1023\}$ is to be configured by higher-layer signaling to the UE and wherein the initialized sequence satisfies $c_{init} = n_{RNTI} \cdot 2^{15} + n_{ID}$, wherein $c_{init}$ is the initialized sequence, and $n_{RNTI}$ corresponds to a network temporary identifier (RNTI) associated with a PUSCH transmission.

26. The apparatus according to claim 25, wherein the instructions, when executed, cause the apparatus further to perform:

sending second DCI in a common search space with CRC scrambled by the UE ID of the UE, the second DCI scheduling communication of a second PUSCH for the UE; and in response to the second DCI being in the common search space, generating a second sequence by initializing the second sequence with a cell ID, and descrambling the second PUSCH using the second sequence.

27. The apparatus of claim 26, wherein the second DCI uses the format 0_0.

28. The apparatus of claim 25, wherein the instructions, when executed, cause the apparatus further to perform:

sending the configurable parameter to the UE.

29. The apparatus of claim 25, wherein the UE ID comprises a cell-radio network temporary identifier (C-RNTI), a modulation and coding scheme-C-RNTI (MCS-C-RNTI) or a configured scheduling-RNTI (CS-RNTI).

30. The apparatus according to claim 25, wherein the instructions, when executed, cause the apparatus further to perform:

generating the first sequence by initializing the first sequence with the configurable parameter sent to the UE; and descrambling the first PUSCH using the first sequence.

31. The apparatus of claim 30, wherein initializing the first sequence with the configurable parameter comprises:

generating the initialized sequence of the first sequence based on the configurable parameter.

32. The apparatus of claim 30, wherein initializing the first sequence with the configurable parameter comprises:

obtaining the first sequence using the initialized sequence.

33. The apparatus of claim 25, wherein sending the first DCI comprises sending the first DCI after a radio resource control (RRC) configuration procedure is performed.

34. The apparatus of claim 25, wherein the instructions, when executed, cause the apparatus further to perform:

receiving the first PUSCH scheduled by the first DCI.

* * * * *

UNITED STATES PATENT AND TRADEMARK OFFICE
CERTIFICATE OF CORRECTION

| | | |
|---|---|---|
| PATENT NO. | : 12,069,675 B2 | Page 1 of 1 |
| APPLICATION NO. | : 17/326696 | |
| DATED | : August 20, 2024 | |
| INVENTOR(S) | : Maaref et al. | |

It is certified that error appears in the above-identified patent and that said Letters Patent is hereby corrected as shown below:

In the Claims

In Column 38, in Claim 1, Line 19, delete "$n_{ID}$" and insert -- $n_{ID}$, --.

In Column 38, in Claim 1, Line 22, delete "$N_D$," and insert -- $n_{ID}$, --.

In Column 39, in Claim 8, Line 6, delete "+$n_{ID}$ wherein cant" and insert -- +$n_{ID}$, wherein $c_{init}$ --.

In Column 40, in Claim 18, Line 2, delete "$n_{ID}$" and insert -- $n_{ID}$, --.

Signed and Sealed this
First Day of October, 2024

Katherine Kelly Vidal
*Director of the United States Patent and Trademark Office*